(12) United States Patent
Fonss et al.

(10) Patent No.: US 8,732,070 B2
(45) Date of Patent: *May 20, 2014

(54) SYSTEM AND PROCESS FOR CREATING, MONITORING, AND TRANSFORMING MULTIPLE INTERESTS OF ONE OR MORE ISSUER ENTITIES AT SYSTEM DETERMINED INTERVALS BASED ON A VARIABLE OR INDEX

(71) Applicant: Accushares Holdings LLC, New Canaan, CT (US)

(72) Inventors: Jack Fonss, New Canaan, CT (US); Edward J. Cataldo, Westport, CT (US); Forrest Gilman, Closter, NJ (US)

(73) Assignee: Accushares Holdings LLC, New Canaan, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/767,622

(22) Filed: Feb. 14, 2013

(65) Prior Publication Data

US 2013/0246243 A1  Sep. 19, 2013

Related U.S. Application Data

(60) Provisional application No. 61/611,267, filed on Mar. 15, 2012, provisional application No. 61/622,179, filed on Apr. 10, 2012.

(51) Int. Cl.
*G06Q 40/06* (2012.01)

(52) U.S. Cl.
CPC ..................................... *G06Q 40/06* (2013.01)
USPC .......................................................... 705/37

(58) Field of Classification Search
CPC .............................. G06Q 40/04; G06Q 40/00
USPC .......................................................... 705/37
See application file for complete search history.

(56) References Cited

U.S. PATENT DOCUMENTS

| | | | |
|---|---|---|---|
| 5,987,435 A | 11/1999 | Weiss et al. | |
| 6,513,020 B1 * | 1/2003 | Weiss et al. | 705/36 R |
| 7,249,077 B2 * | 7/2007 | Williams et al. | 705/35 |
| 7,865,426 B2 * | 1/2011 | Volpert | 705/37 |
| 2008/0046292 A1 | 2/2008 | Myers et al. | |
| 2009/0063363 A1 * | 3/2009 | Present et al. | 705/36 R |
| 2011/0087679 A1 | 4/2011 | Rosato et al. | |
| 2011/0191234 A1 * | 8/2011 | Kiron | 705/37 |
| 2011/0289017 A1 | 11/2011 | Renshaw | |

(Continued)

OTHER PUBLICATIONS

U.S. Appl. No. 61/611,267, filed Mar. 15, 2012, entitled "A Processing System for Creating and Transforming Two Claims of a Single Issuer Entity at System Determined Intervals Based on a Variable or Index" (22 pages).

(Continued)

*Primary Examiner* — Bruce I Ebersman
(74) *Attorney, Agent, or Firm* — McCarter & English, LLP

(57) ABSTRACT

The disclosed embodiments relate to information systems and to real-time processes residing on a computer system. More specifically, the disclosed embodiments relate to systems and methods for creating, monitoring, processing, and transforming the beneficial interests of one or more entities which issue two or more offsetting claim interests which are linked to changes in an endogenous or exogenous variable or index. Such offsetting interest claims will be subject to transformation by the system where system transformations will modify the relative entitlements.

8 Claims, 22 Drawing Sheets

Issuer Entity

| assets | liabilities |
|---|---|
| cash $200 | S Interests (100) @ $1 |
|  | L Interests (100) @ $1 |
| 200 | (200) |

Issuer Entity S

| assets | liabilities |
|---|---|
| cash $100 | S Interests (100) @ $1 |
| 100 | (100) |

(56) References Cited

U.S. PATENT DOCUMENTS

| | | | |
|---|---|---|---|
| 2012/0078773 A1 | 3/2012 | Seale et al. | |
| 2012/0078774 A1* | 3/2012 | Seale et al. | 705/37 |
| 2012/0150767 A1* | 6/2012 | Chacko et al. | 705/36 R |
| 2012/0166326 A1 | 6/2012 | Sapir et al. | |

OTHER PUBLICATIONS

U.S. Appl. No. 61/622,179, filed Apr. 10, 2012, entitled "Processing System for Creating, Monitoring and Transforming Multiple Interests of One or More Issuer Entities at System Determined Intervals Based on a Variable or Index" (33 pages).

U.S. Appl. No. 61/501,231, filed Jun. 26, 2011, entitled "System and Method for the Creation and Rebalancing of Beneficial Interests in Index Tracking Investment Vehicles Over Multiple Market Periods" (87 pages).

U.S. Appl. No. 61/515,310, filed Aug. 4, 2011, entitled "System and Method for the Creation and Rebalancing of Beneficial Interests in Index Tracking Investment Vehicles Over Multiple Market Periods" (117 pages).

U.S. Appl. No. 61/535,644, filed Sep. 16, 2011, entitled "System and Method for the Creation and Rebalancing of Beneficial Interests in Index Tracking Investment Vehicles Over Multiple Market Periods" (135 pages).

U.S. Appl. No. 61/547,393, filed Oct. 14, 2011, entitled "System and Method for the Creation and Rebalancing of Beneficial Interests in Index Tracking Investment Vehicles Over Multiple Market Periods" (154 pages).

Co-Pending U.S. Appl. No. 13/350,012, filed Jan. 13, 2012, entitled "System and Method for the Creation and Rebalancing of Beneficial Interests in Tracking Investment Vehicles Over Multiple Market" (108 pages).

Co-Pending U.S. Appl. No. 13/619,643, filed Sep. 14, 2012, entitled "System and Method for the Creation and Rebalancing of Beneficial Interests in Index Tracking and Other Investment Vehicles Over Multiple Market Periods Using Fixed or Regularly Resetting Prices to Calibrate Outstanding Interest Counts with Liquidation Entitlements" (68 pages).

Office Action mailed on Jan. 17, 2013, issued in connection with Co-Pending U.S. Appl. No. 13/619,643 (15 pages).

Election/Restriction mailed on Apr. 27, 2012, issued in connection with CoPending U.S. Appl. No. 13/350,012 (8 pages).

Response to Election/Restriction mailed on Apr. 27, 2012, issued in connection with Co-Pending U.S. Appl. No. 13/350,012 (10 pages).

Election/Restriction mailed on Jun. 12, 2012, issued in connection with Co-Pending U.S. Appl. No. 13/350,012 (6 pages).

Response to Election/Restriction mailed on Jun. 12, 2012, issued in connection with Co-Pending U.S. Appl. No. 13/350,012 (7 pages).

Notice of Non-Compliant Amendment mailed Aug. 23, 2012, issued in connection with Co-Pending U.S. Appl. No. 13/350,012 (2 pages).

Response to Notice of Non-Compliant Amendment mailed Aug. 23, 2012, issued in connection with Co-Pending U.S. Appl. No. 13/350,012 (7 pages).

Office Action mailed on Feb. 25, 2013, issued in connection with Co-Pending U.S. Appl. No. 13/350,012 (9 pages).

U.S. Securities and Exchange Commission website, Leveraged and Inverse ETFs: Specialized Products with Extra Risks for Buy-and-Hold in, pp. 1-4, http://www.sec.gov/investor/pubs/leveragedetfs-alert.htm (4 pages).

ProFunds Group, ProFunds Group Investor Education Series, "The Universal Effects of Compounding and Leveraged Funds", vol. 1, Spring 2009, pp. 1-2 http://www.profunds.com/media/pdf/publications/CompVol1072809.pdf (2 pages).

"Why Leveraged ETFs Don't Always Boost Returns", http://www.investopedia.com/articles/exchangetradedfunds/09/broken-leveraged-etfs.asp (2 pages).

Arca's Paired Trust Shares SEC proposed rule Oct. 29, 2008 (6 pages).

Arca's Paired Trust Shares SEC proposed rule Aug. 5, 2008 (18 pages).

NASDAQ Correspondence.

NASDAQ Rules Change.

NASDAQ Rules Amendment.

* cited by examiner

FIG. 1A

Issuer Entity

| assets | liabilities |
|---|---|
| cash $200 | S Interests (100) @ $1 |
|  | L Interests (100) @ $1 |
| 200 | (200) |

FIG. 1B

Issuer Entity S

| assets | liabilities |
|---|---|
| cash $100 | S Interests (100) @ $1 |
| 100 | (100) |

FIG. 1C

Issuer Entity L

| assets | liabilities |
|---|---|
| cash $100 | |
|  | L Interests (100) @ $1 |
| 100 | (100) |

$$\text{Price}(S)_t = \text{Max}\{0, \text{Price}(S)_{t-1} \times [1 - L \times VR_t] + [SWC_t \times C_t - SWF_t \times F_t)]\}$$

$$\text{Price}(L)_t = \text{Max}\{0, \text{Price}(L)_{t-1} \times [1 + L \times VR_t] + [LWC_t \times C_t - LWF_t \times F_t)]\}$$

where:

$$-1 \times [\text{Price}(S)_t - \text{Price}(S)_{t-1}] \equiv 1 \times [\text{Price}(L)_t - \text{Price}(L)_{t-1}]$$
when C and F are zero

FIG. 4

Entity Issuer

| assets | liabilities |
|---|---|
| cash $200 | S Interests (100) @ $0.90 |
| | L Interests (100) @ $1.10 |
| 200 | (200) |

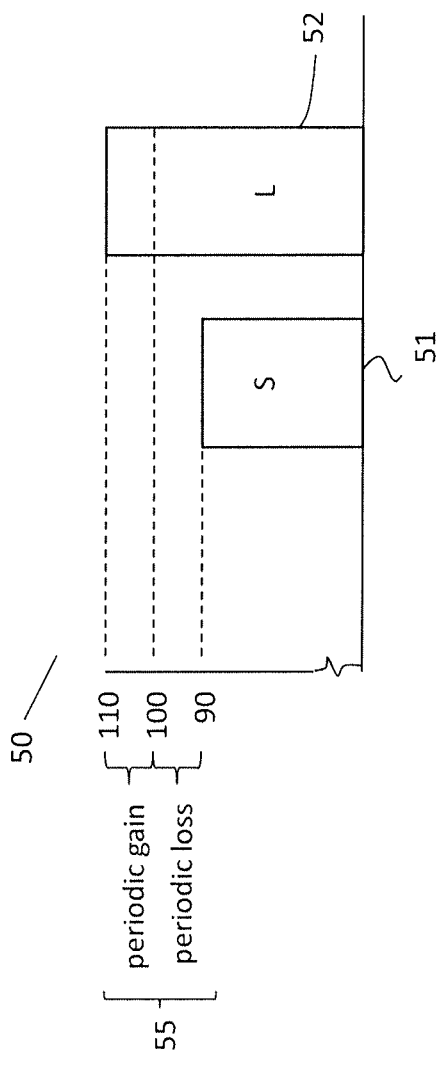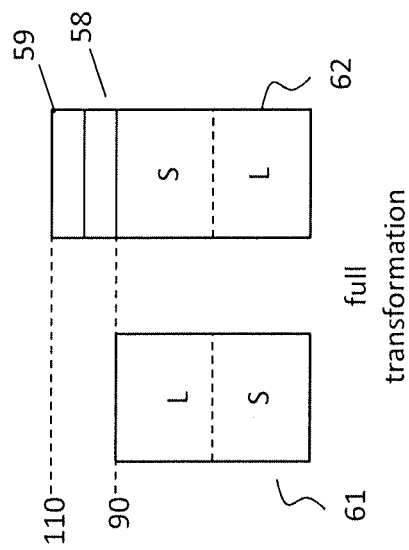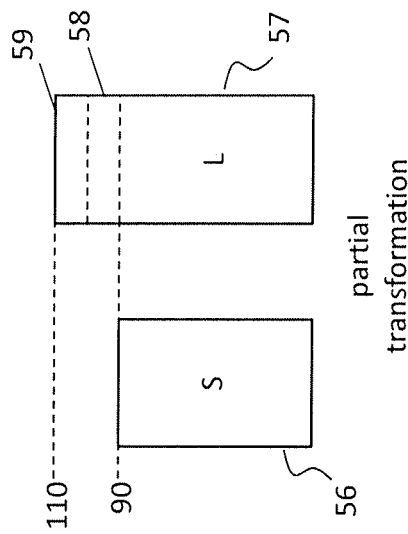

FIG. 8

27 — $\text{Price}(S)_t = \text{Max} \{0, \text{Price}(S)_{t-1} \times [1 - L \times VR_t] + [SWC_t \times C_t - SWF_t \times F_t)]\}$ 28 — $\text{Price}(L)_t = \text{Max} \{0, \text{Price}(L)_{t-1} \times [1 + L \times VR_t] + [LWC_t \times C_t - LWF \times F_t)]\}$ 81 — $\begin{cases} TV(S)_t = \text{Max} [0, (\text{Price}(S)_t - \text{Price}(L)_t) \times \{\text{number of S interests}\}] \\ TV(L)_t = \text{Max} [0, (\text{Price}(L)_t - \text{Price}(S)_t) \times \{\text{number of L interests}\}] \end{cases}$ 82 — $\begin{cases} TU(S)_t = TV(S)_t / \text{Min} [\text{Price}(S)_t, \text{Price}(L)_t] \\ TU(L)_t = TV(L)_t / \text{Min} [\text{Price}(S)t, \text{Price}(L)t] \end{cases}$ 83 — $\begin{cases} U(S)_t = U(S)_{t-1} + TU(S)_t + \{\text{creations of S interests}\} - \{\text{redemptions of interests}\} \\ U(L)_t = U(L)_{t-1} + TU(L)_t + \{\text{creations of L interests}\} - \{\text{redemptions of interests}\} \end{cases}$

Partial Transformation

84 — 
Short Interests
$S_t = S_{t-1} + 0.5 \times TU(S)_t$
$L_t = 0 + 0.5 \times TU(S)_t$
Long Interests
$S_t = 0 + 0.5 \times TU(L)_t$
$L_t = L_{t-1} + 0.5 \times TU(L)_t$

Full Transformation

85 — 
Short Interests
$S_t = 0.5 \times S_{t-1} + 0.5 \times TU(S)_t$
$L_t = 0.5 \times S_{t-1} + 0.5 \times TU(S)_t$
Long Interests
$S_t = 0.5 \times L_{t-1} + 0.5 \times TU(L)_t$
$L_t = 0.5 \times L_{t-1} + 0.5 \times TU(L)_t$

Post-Transformation Price

86 — $\text{Price}(S,L)_t = \{\text{cash in issuer entity*}\} / [U(S)_t + U(L)_t]$ adjusted for any expense accruals

FIG. 9

27 — $Price(S)_t = Max\{0, Price(S)_{t-1} \times [1 - L \times VR_t] + [SWC_t \times C_t - SWF_t \times F_t)]\}$ 28 — $Price(L)_t = Max\{0, Price(L)_{t-1} \times [1 + L \times VR_t] + [LWC_t \times C_t - LWF_t \times F_t)]\}$ 92 — $\begin{cases} D(S)_t = Max[0, U(S)_{t-1} \times (Price(S)_t - Price(S)_{t-1})] \\ D(L)_t = Max[0, U(L)_{t-1} \times (Price(L)_t - Price(L)_{t-1})] \end{cases}$ 93 — $Price'(S,L)_t = Price(S,T)_{t-1} - [2 \times (D(S)_t + D(L)_t)] / [U(S)_t + U(L)_t]$ 94 — $\begin{cases} TV(S)_t = Max[0, (Price(S)_t - Price(L)_t) \times U(S)_{t-1} - D(S)_t] \\ TV(L)_t = Max[0, (Price(L)_t - Price(S)_t) \times U(L)_{t-1} - D(L)_t] \end{cases}$ 95 — $\begin{cases} TU(S)_t = TV(S)_t / Price'(S,L)_t \\ TU(L)_t = TV(L)_t / Price'(S,L)_t \end{cases}$ 96 — $\begin{cases} U(S)_t = U(S)_{t-1} + TU(S)_t + \{\text{creations of S int}\} - \{\text{redemptions of S int}\} \\ U(L)_t = U(L)_{t-1} + TU(L)_t + \{\text{creations of L int}\} - \{\text{redemptions of L int}\} \end{cases}$ Full Transformation 97 — Short Interests
$S_t = 0.5 \times [U(S)_{t-1} \times Price(S)t - D(S)t] / Price'(S,L)t$
$L_t = 0.5 \times [U(S)_{t-1} \times Price(S)t - D(S)t] / Price'(S,L)t$
Long Interests
$S_t = 0.5 \times [U(L)_{t-1} \times Price(L)t - D(L)t] / Price'(S,L)t$
$L_t = 0.5 \times [U(L)_{t-1} \times Price(L)t - D(L)t] / Price'(S,L)t$ Post-Transformation Price 98 — $Price(S,L)_t = \{\text{cash in issuer entity*}\} / [U(S)_t + U(L)_t]$ adjusted for any expense accruals

FIG. 10

| | Period | 0 | 1 | 2 | 3 |
|---|---|---|---|---|---|
| 1 | Period | 0 | 1 | 2 | 3 |
| 2 | Return | | 10% | 10% | -5% |
| 3 | Index | 100 | 110 | 121 | 114.95 |
| | Open Interests and Price | | | | |
| 4 | Short(S) Interests @ Open | | 100.00 | 111.11 | 123.46 |
| 5 | Long(L) Interests @ Open | | 100.00 | 111.11 | 123.46 |
| 6 | Price (S,L) @ Open | | 1.0000 | 0.9000 | 0.8100 |
| | Close Prices | | | | |
| 7 | Price(S) @ Close | | 0.9000 | 0.8100 | 0.8505 |
| 8 | Price(L) @ Close | | 1.1000 | 0.9900 | 0.7695 |
| | Adjustment Values | | | | |
| 9 | Adjustment Value: TV(S) | | 0.00 | 0.00 | 10.00 |
| 10 | Adjustment Value: TV(L) | | 20.00 | 20.00 | 0.00 |
| | Adjustment Units | | | | |
| 11 | Adjustment Units: TU(S) | | 0.0000 | 0.0000 | 12.9955 |
| 12 | Adjustment Units: TU(L) | | 22.2222 | 24.6914 | 0.0000 |
| | Aggregate Units | | | | |
| 13 | Units or Interests: U(S) | | 100.0000 | 111.1111 | 136.4522 |
| 14 | Units or Interests: U(L) | | 122.2222 | 135.8025 | 123.4568 |
| | S Interests Transformation | | | | |
| 15 | S Interests | | 100.0000 | 111.1111 | 129.9545 |
| 16 | L Interests | | 0.0000 | 0.0000 | 6.4977 |
| | L Interests Transformation | | | | |
| 17 | S Interests | | 11.1111 | 12.3457 | 0.0000 |
| 18 | L Interests | | 111.1111 | 123.4568 | 123.4568 |
| 19 | Total Interests | | 222.2222 | 246.9136 | 259.9090 |
| 20 | Interest Price | | 0.9000 | 0.8100 | 0.7695 |

FIG. 11

| | Period | 0 | 1 | 2 | 3 |
|---|---|---|---|---|---|
| 1 | Period | 0 | 1 | 2 | 3 |
| 2 | Return | | 10% | 10% | -5% |
| 3 | Index | 100 | 110 | 121 | 114.95 |
| | *Open Interests and Price* | | | | |
| 4 | Short(S) Interests @ Open | | 100.00 | 111.11 | 123.46 |
| 5 | Long(L) Interests @ Open | | 100.00 | 111.11 | 123.46 |
| 6 | Price (S,L) @ Open | | 1.0000 | 0.9000 | 0.8100 |
| | *Close Prices* | | | | |
| 7 | Price(S) @ Close | | 0.9000 | 0.8100 | 0.8505 |
| 8 | Price(L) @ Close | | 1.1000 | 0.9900 | 0.7695 |
| | *Adjustment Values* | | | | |
| 9 | Adjustment Value: TV(S) | | 0.00 | 0.00 | 10.00 |
| 10 | Adjustment Value: TV(L) | | 20.00 | 20.00 | 0.00 |
| | *Adjustment Units* | | | | |
| 11 | Adjustment Units: TU(S) | | 0.0000 | 0.0000 | 12.9955 |
| 12 | Adjustment Units: TU(L) | | 22.2222 | 24.6914 | 0.0000 |
| | *Aggregate Units* | | | | |
| 13 | Units or Interests: U(S) | | 100.0000 | 111.1111 | 136.4522 |
| 14 | Units or Interests: U(L) | | 122.2222 | 135.8025 | 123.4568 |
| | *S Interests Transformation* | | | | |
| 15 | S Interests | | 50.0000 | 55.5556 | 68.2261 |
| 16 | L Interests | | 50.0000 | 55.5556 | 68.2261 |
| | *L Interests Transformation* | | | | |
| 17 | S Interests | | 61.1111 | 67.9012 | 61.7284 |
| 18 | L Interests | | 61.1111 | 67.9012 | 61.7284 |
| 19 | Total Interests | | 222.2222 | 246.9136 | 259.9090 |
| 20 | Interest Price | | 0.9000 | 0.8100 | 0.7695 |

FIG. 12

| | | 0 | 1 | 2 | 3 |
|---|---|---|---|---|---|
| 1 | Period | 0 | 1 | 2 | 3 |
| 2 | Return | | 10% | 10% | -5% |
| 3 | Index | 100 | 110 | 121 | 114.95 |
| | Open Interests and Price | | | | |
| 4 | Short(S) Interests @ Open | | 100.00 | 105.56 | 111.42 |
| 5 | Long(L) Interests @ Open | | 100.00 | 105.56 | 111.42 |
| 6 | Price (S,L) @ Open | | 1.0000 | 0.9000 | 0.8100 |
| | Close Prices | | | | |
| 7 | Price(S) @ Close | | 0.9000 | 0.8100 | 0.8505 |
| 8 | Price(L) @ Close | | 1.1000 | 0.9900 | 0.7695 |
| | Cash Distribution | | | | |
| 9 | Short Cash Distribution: D(S) | | 0.0000 | 0.0000 | 4.5125 |
| 10 | Long Cash Distribution: D(L) | | 10.0000 | 9.5000 | 0.0000 |
| 11 | which interest? | | L | L | S |
| | Post-Cash Distribution Price | | | | |
| 12 | Price(S,L) | | 0.9000 | 0.8100 | 0.7695 |
| | Adjustment Values | | | | |
| 13 | Adjustment Value: TV(S) | | 0.00 | 0.00 | 4.51 |
| 14 | Adjustment Value: TV(L) | | 10.00 | 9.50 | 0.00 |
| | Adjustment Units | | | | |
| 15 | Adjustment Units: TU(S) | | 0.0000 | 0.0000 | 5.8642 |
| 16 | Adjustment Units: TU(L) | | 11.1111 | 11.7284 | 0.0000 |
| | S Interests Transformation | | | | |
| 17 | S Interests | | 50.0000 | 52.7778 | 58.6420 |
| 18 | L Interests | | 50.0000 | 52.7778 | 58.6420 |
| 19 | Cash Distribution | | 0.0000 | 0.0000 | 4.5125 |
| | L Interests Transformation | | | | |
| 20 | S Interests | | 55.5556 | 58.6420 | 55.7099 |
| 21 | L Interests | | 55.5556 | 58.6420 | 55.7099 |
| 22 | Cash Distribution | | 10.0000 | 9.5000 | 0.0000 |
| 23 | Net Cash | | 190.0000 | 180.5000 | 175.9875 |
| 24 | Total Interests | | 211.1111 | 222.8395 | 228.7037 |
| 25 | Interest Price | | 0.9000 | 0.8100 | 0.7695 |

FIG. 13

|  | | per Unit | Open Value | Closing Longs | Closing Shorts | Closing Dividend | Closing Value | Realized Return | Index Return |
|---|---|---|---|---|---|---|---|---|---|
| | Period 0 to 1 | | | | | | | | |
| 1L | Holder of Longs | 10 | 10.00 | 11.1111 | 1.1111 | 0.0000 | 11.0000 | 10.00% | 10% |
| 1S | Holder of Shorts | 10 | 10.00 | 0.0000 | 10.0000 | 0.0000 | 9.0000 | -10.00% | 10% |
| | Period 1 to 2 | | | | | | | | |
| 2L | Holder of Longs | 10 | 9.00 | 11.1111 | 1.1111 | 0.0000 | 9.9000 | 10.00% | 10% |
| 2S | Holder of Shorts | 10 | 9.00 | 0.0000 | 10.0000 | 0.0000 | 8.1000 | -10.00% | 10% |
| | Period 2 to 3 | | | | | | | | |
| 3L | Holder of Longs | 10 | 8.10 | 10.0000 | 0.0000 | 0.0000 | 7.6950 | -5.00% | -5% |
| 3S | Holder of Shorts | 10 | 8.10 | 0.5263 | 10.5263 | 0.0000 | 8.5050 | 5.00% | -5% |

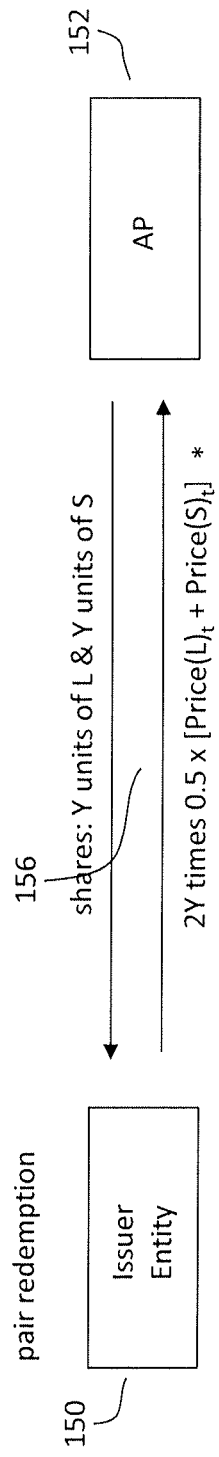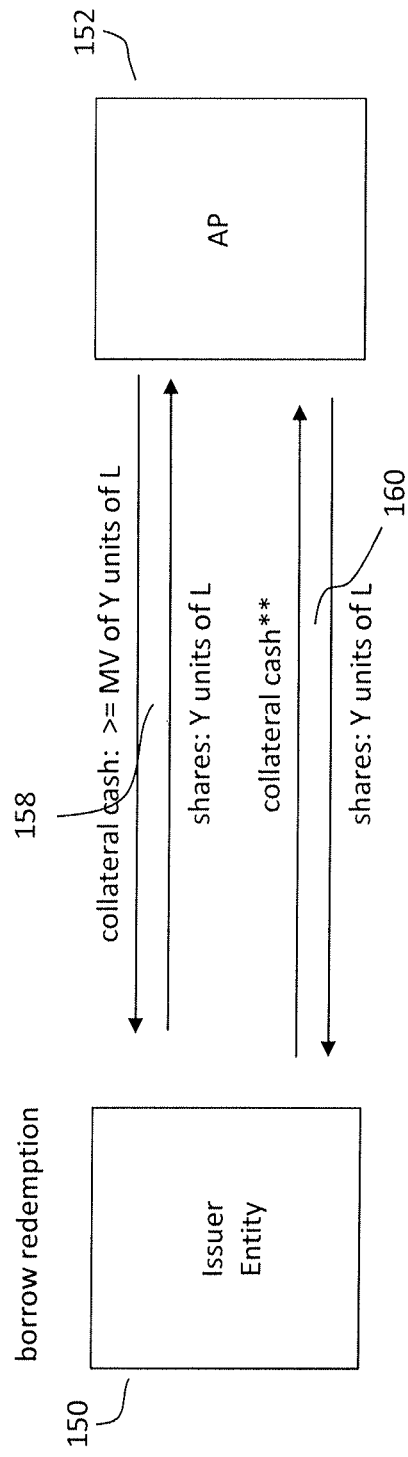

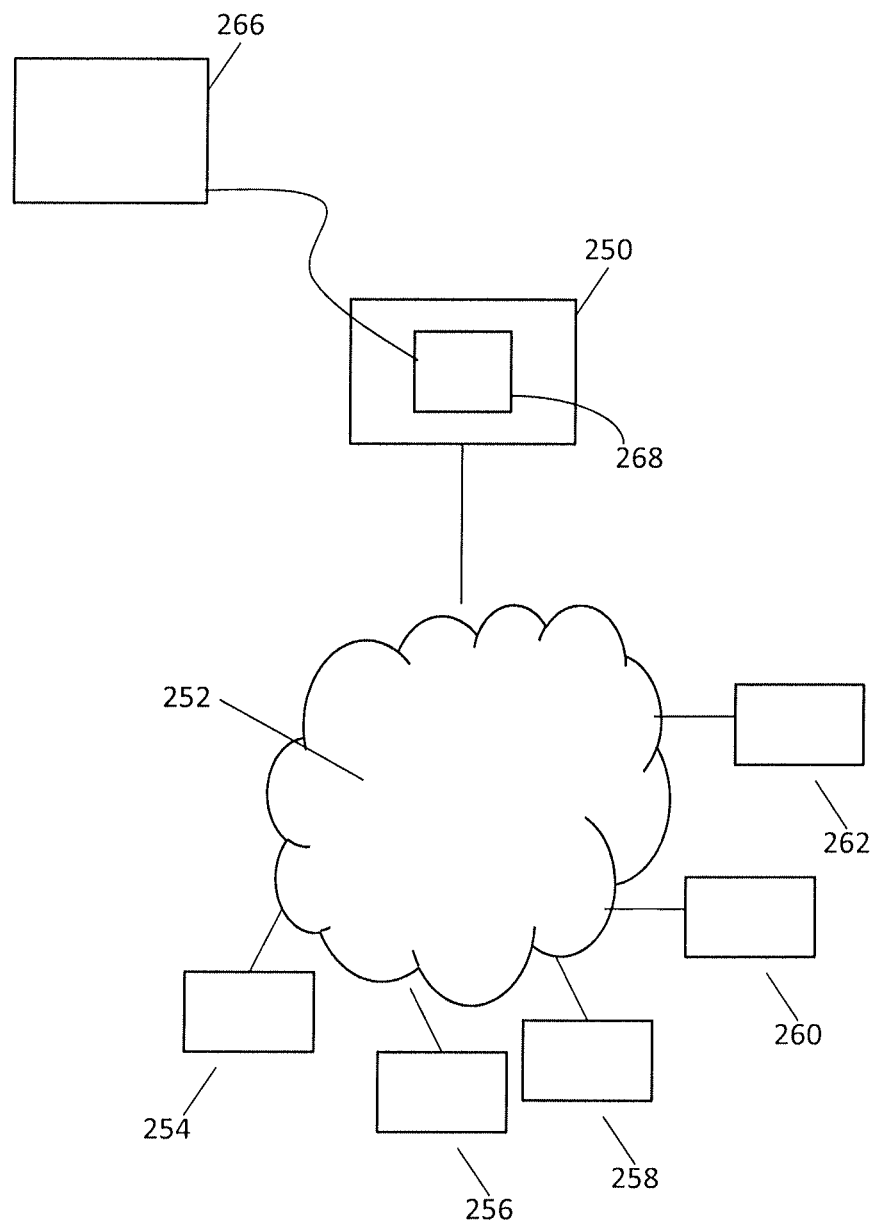

SYSTEM AND PROCESS FOR CREATING, MONITORING, AND TRANSFORMING MULTIPLE INTERESTS OF ONE OR MORE ISSUER ENTITIES AT SYSTEM DETERMINED INTERVALS BASED ON A VARIABLE OR INDEX

BACKGROUND

1. Field of Disclosure

The disclosed embodiments relate to electronic trading of funds, electronic funds management, and real-time fund processing systems.

2. Background of the Disclosure

The financial industry utilizes various tools to assist it in tracking and reacting to changes in the market such as changes in index, asset, share/claim counts, prices, returns and the like. Some of these tools include specialized computer based systems to assist in performing various tasks. To date, however, these systems have had many draw backs and disadvantages despite some advantages they provide.

For example, U.S. Pat. No. 5,987,435 to Weiss et al discloses a proxy asset data processor. The disclosed data processing system manages and implements a form of trading security designated as a proxy asset. Proxy assets according to the '435 patent purportedly provides a sophisticated risk management capabilities without the complexities associated with other types of risk management investment vehicles. The proxy asset is made possible by the enhanced processing capabilities of the proxy asset data processor that create, track, manage, and govern asset accounts for participating investors. The '435 patent has an Up Proxy Asset and a Down Proxy Asset that is an interface between the Pooled Sales Proceeds and the Broker Markets to provide security.

Another example is U.S. Pat. No. 6,513,020 also to Weiss et al. that discloses another data processing system manages and implements a form of security designated as proxy asset. This system is some what different than the related '435 patent. Again, proxy assets purportedly provide a sophisticated risk management capability without the complexities associated with other types of risk management investment vehicles. The Proxy Asset is made possible by the enhanced processing capabilities of the Proxy Asset data processor which create, track, manage, and govern asset accounts for participating investors. The '020 patent does have segregated Proxy Assets. The '020 patent discloses a Proxy Asset interface between the Cash asset and Broker Markets to provide security.

In both of these cases, the patents define in the Background sections Proxy Assets as a type of security designed to make effectively tradable existing broad categories of illiquid assets or claims on income flows, assets or claims that are individually difficult or impossible to buy, hold, or sell directly. The Proxy Asset is designed to have a traded market price that reflects the true liquid-market value of illiquid assets or claims . . . ". The Proxy Asset does not identify who is doing the trading, such as market professionals, market makers, sophisticated institutions, and sophisticated individuals.

The '435 patent and the '020 patent are limited to operation over proxy assets; and limited to the transformation of "illiquid assets or claims" into tradable instruments. Mechanistically, both patents rely on a segregation of assets within an entity which has issued shares to investors. Each class or group of issued shares is linked to a unique "proxy asset account value" where value is shifted among all "proxy asset account values" by reference to an "account formula."

The '020 patent extends references to proxy assets (singular for a share) to encompass proxy asset groups to incorporate more complex proxy asset combinations and arrangements. It also extends value shifts to be performed with respect to higher order groupings of proxy assets in each "account formula", and contemplates that assets other than cash may be moved (actually or nominally) under the account payout formulas.

Importantly, both the '435 and '020 discloses segregated asset account values are used consistently in both patents for the purpose of driving the linked interests.

However, there are still draw backs with these systems and other similar systems in the art. For example, none of these financial systems address the needs of a system with transformations of interests, having no asset segregation, real time market monitoring of system (intrinsic) values with realized real-time market trading values, and automated system responsiveness to alter the transformations in response to real-time monitoring. There still remains a need in the art for a financial system and method based on issuers which issue and distribute interests which resolve accurate holder values at intervals measured in days, weeks or months rather than years. There is a further need to have no segregation of accounts or assets and all shares have an equal claim in liquidation (different shares may have differing entitlement to shares distributions). The financial system and method should also perform continuous real-time monitoring to compare system created intrinsic values with realized market trading values. It should also transform all shares into offsetting index neutral positions upon the occurrence of a tracking error to ensure that holders of interests realize accurate outcomes regardless of market conditions.

SUMMARY AND OBJECTS OF THE INVENTION

The present invention provides for a system and method for providing a user with a financial tool to create, monitor, and transform interests of one or more issuing entities where interests are created in offsetting groupings (pairs, triplets, quadruplets, or higher order groupings). Such offsetting groupings will be linked to a variable or index such that changes in the value of the variable or index will alter the entitlement an interest has over the issuing entity assets. The disclosed system and processes are specifically applied to create interests and to subsequently transform the created interests where the interests are either materialized interests held as physical certificates or immobilized interests held at a central depository such as the Depository Trust & Clearing Corporation (DTCC) where registered direct and indirect holders are indicated on the records of DTCC. Interests when created and transformed, represent tangible property of a holder such that interests can be sold, pledged or otherwise transacted as an article of property with precisely determined parameters.

Where the created interests are in linked pairs, one interest of the pair is positively related to a variable or index (the "Positive Interest") and the other interest of the pair is negatively related to the same variable or index (the "Negative Interest"). While the separate interests which comprise a linked pair are only created by the system in matched pairs (i.e. a Negative Interest is created simultaneous with a Positive Interest), Negative Interests and Positive Interests are separately tradable following creation by the system. The terms "interest" and "claim" are used herein and are intended to be synonymous with any interest in or claim on an issuing entity including shares, certificates, notes, deposits, and derivatives thereof.

The linked variable or index may be endogenous or exogenous to the issuing entity and examples include: government reported levels of price inflation, stock market index levels, crude oil prices, industrial or precious metals prices, agricultural commodity prices, and government published unemployment rates. Unlike previously known methods, there is no limitation relating to illiquidity or tradability as measured prior to or following any implementation or embodiments. In an example of a pair grouping where the linked variable is crude oil prices, the system creates two interests where one interest is positively related to the change in oil prices and one interest is negatively related to the change in oil prices. In the disclosed embodiment, the system will automatically track and schedule transformation dates, and on each transformation date, the system will automatically transform one or more interests of a grouping into a full or partial amalgamation of offsetting interests; the determination to implement full or partial transformations into such amalgamation will be based on real-time system monitoring as described below. Further, in a preferred embodiment, based on specific thresholds or triggers set by the system administrator relating to the aggregate value of a distribution, the system will distribute interests which are immediately redeemed for cash; the threshold or trigger for a preferred embodiment, expressed as a percentage of the aggregate value of the issuer or issuers, may take on any value between 0 and 100%. In an alternate preferred embodiment, the system will nominally compute the respective interest's claims and distribute an amount of cash or issuing entity assets in lieu of interests Previously known methods have specified arrangements in which interests are issued in pairs by separate issuing entities where the separate issuing entities engage in bilateral derivatives or other transactions between each other to adjust the respective assets and liabilities in response to the changes in a linked variable or index. The previously known methods have relied solely on broad arbitrage principles to maintain accurate market prices and accurate return tracking; no process of transformation or modification exists in previously known methods.

Adverting to FIG. 6, the figure illustrates two interests whose value diverges from system generated values; the solid lines indicate realized market prices and the dashed lines indicate system generated and mathematically correct values (note that the labels along the x-axis would not be applicable to previously known methods as previously known methods not do have transformation dates). The undesirable divergence illustrated in the figure shows that the L interest has a system price and theoretical value of 1.10, but due to imbalanced market forces it has attracted a higher trading value (i.e. that value at which it is being transacted between buyers and sellers unrelated to the issuer) equal to 1.20. Correspondingly, the S interest has a system price value and theoretical value of 0.90, but due to an imbalance in market forces, it has a trading value of 0.80; the sums of the system and trading values are equal (both 2.00), but the S interest suffers from undervaluation and the L interest will ultimately suffer from a price-bubble deflation when its value will align on some uncertain future date in the form of a sharp drop. The arbitrage assumption built into known methods assumes that market professionals will react in a timely manner to price imbalances, and in the example depicted in FIG. 6, it would be assumed that market professionals would purchase the S interest in order to effect redemptions, or purchase the S interest and sell the L interest on a short or borrow basis. The primary fallacy in reliance on basic arbitrage to realign such price anomalies is that no arbitrage opportunity is available to exploit; because the interests are offsetting and because the discount associated with the "cheap" interest (the S interest) is equal (or close) in magnitude to the premium associated with the "rich" interest (the L interest), there is no incentive for market makers or arbitrageurs to transact.

In one departure from known methods, the disclosed system monitors deviations between market prices and system generated prices, and the disclosed embodiment transforms interests on a periodic basis (based on system determinations) to cause market trading prices to properly align with system generated prices.

In a second departure from previously known methods, the disclosed embodiment realigns the related variable or index to the outstanding interests with regularity on each transformation date. Where previously know methods maintain their initial variable or index level throughout the life of the interests, the disclosed embodiment recalibrates the interests with a modified related variable or index level. As a result period-to-period tangible returns are correct as indicated in FIGS. 13 and 14 rather than inaccurate as illustrated in FIG. 15 relating to the previously known methods.

The disclosed embodiment is a novel system of processes where each interest is transformed by the system into an amalgamation of interests at: (i) regular intervals, or (ii) at intervals triggered by system monitoring of changes, settlements or resets in a subject variable or index. The advantages of the disclosed embodiment include:

(i) interests periodical resolve (either partially or fully) into a matched redeemable pair through system transformation so the holder of an interest can effect simple and known redemptions;

(ii) where practical, interests are transformed on timetables consistent with the natural resets of the subject variable or index to cause proper tracking;

(iii) each embodiment includes a system run process where authorized participants or APs (a special class of market makers) can effect timely and accurate creations and redemptions to enable them to transact, and;

(iv) the implementation of the system either entirely or largely obviate expensive market trading and issuing entity position rebalancing.

Known methods have failed due to a number of factors including: (i) tracking errors with respect to one of more of the interests with respect to the related variable or index, (ii) the persistent inability of arbitrageurs or other holders to effect an efficient redemption, (iii) early mandatory redemption of all interests due to movement in the related variable or index, and (iv) a broad inability for market markers or other larger holders to implement risk management strategies.

The disclosed embodiment has a number of marked benefits for participants. Firstly, because interests are created, modified and redeemed in groupings the issuing entity and interests create a closed environment in which participants hold or transact over interests linked to variables and indices currently unavailable on conventional financial exchanges. Secondly some markets, such as those for commodities and metals, have complex pricing curves relating to their spot (today) prices and their forward prices as indicated by exchanges traded futures (storage costs, risk premiums, and time value of money are some of the complicating factors); the groupings created and processed by the system greatly simplify or substantially eliminate complex curve valuations and excess asset trading.

BRIEF DESCRIPTION OF THE FIGURES

FIG. 1A is a table indicating a sample balance sheet of an issuer entity;

FIG. 1B is a figure illustrating a table where the table is the sample balance sheet of an issuer entity of a single interest;

FIG. 1C is an extension of FIG. 1B where the table indicated is a sample balance sheet of an issuer entity of a single interest;

FIG. 4 is a table illustrating the embodiment in FIG. 1, FIG. 4 further illustrates a sample balance sheet of an issuer entity relating to a 10 percent upward movement in the related variable or index;

FIG. 5A is a graphic diagram which illustrates sample interests where the related variable or index has increased 10%;

FIG. 5B is a graphic diagram further illustrating the graphic embodiment in FIG. 5A where FIG. 5B illustrates a system partial transformation;

FIG. 5C is a graphic diagram and further illustrating the graphic embodiment in FIG. 5A where FIG. 5C illustrates a system full transformation;

FIG. 8 is a list of the algorithms used by the system to effect partial and full transformation of interests where no or de minimise cash distributions are made;

FIG. 9 is a list of the algorithms used by the system to effect full transformation of interests where cash distributions equal to the favorable price movement are made;

FIG. 10 is a table which illustrates a system processed three period scenario example where all transformations are partial transformations and where the scenario variable or index returns are +10%, +10%, and −5% for the three periods respectively;

FIG. 11 is a table which illustrates a system processed three period scenario example where all transformations are full transformations and where the scenario variable or index returns are +10%, +10%, and −5% for the three periods respectively;

FIG. 12 is a table which illustrates a system processed three period scenario where all transformations are full transformations with cash distributions and where the scenario variable or index returns are +10%, +10%, and −5% for the three periods respectively;

FIG. 13 is a table of single period returns relating to both L and S interests where the return on an L and an S interest following system transformation is compared with the return on the related variable or index;

FIG. 18 is a diagram which illustrates a redemption of an interests pair between the issuer entity and an authorized participant (AP);

FIG. 19 is a diagram which illustrates the borrow of an interest by an authorized participant (AP);

FIG. 23 is a schematic diagram which illustrates the connectivity of the system hardware and system non-transitory computer media with linked nodes.

DETAILED DESCRIPTION

Figure 1D:
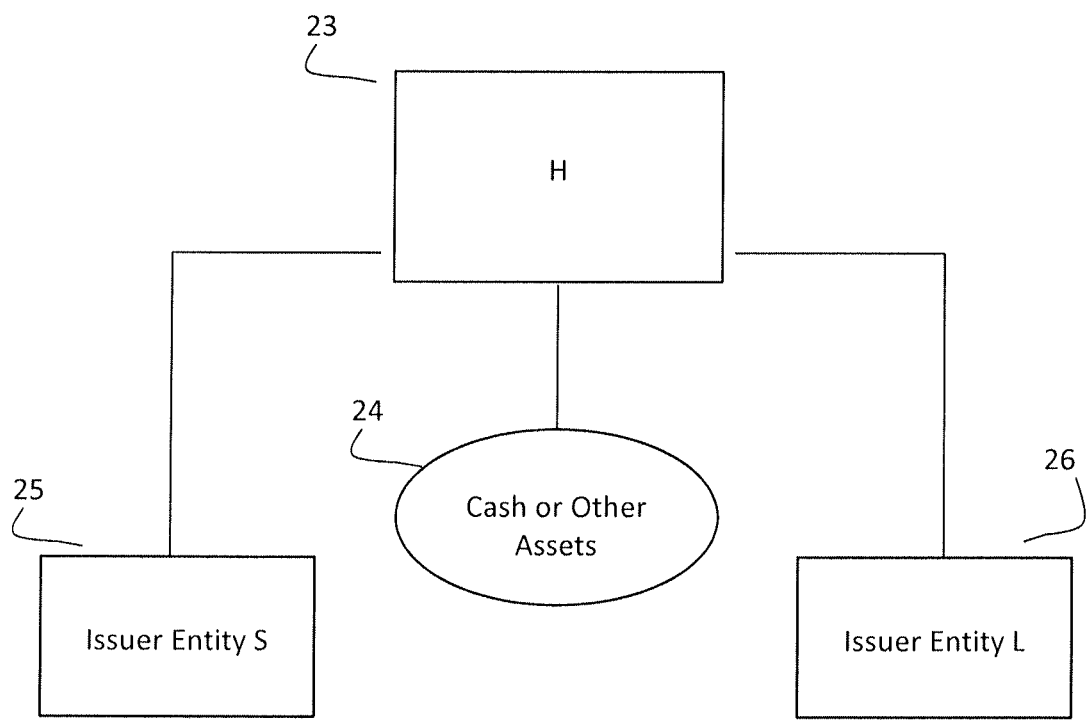
FIG. 1D is a diagram indicating an example of an organizational arrangement where multiple issuer entities issue interest groupings.

The disclosed embodiment is a financial system and method that create, monitor, and transform the interests of one or more issuing entities based on the system monitored values of linked variables or indices where the system monitoring of linked variables or indices is effected by the system over a wired or wireless network, internet connectivity or a combination thereof.

Communication links are preferably data links. Such data link can alternatively be, but is not limited to, an electronic data link, optical fiber connection, wireless data connection or any other known connection used for data transfer, for example, over the internet as an email, text message, instant message or the like, including any other communication. Depending upon the implementation, communication link can operate in one or more modes of transmission. For example, such modes include radio frequency transmissions, optical transmission, microwave transmission, digital or analog transmission, or other known data transmission.

The financial system and method may include a specialized machine such as a server. The server depicts a network, mainframe computer, processor, in communication with or including an image storage/retrieval system, or a database of content as described herein. The Server, when specifically operating in accordance with the principles of the invention operates as a receiver, translator, processor, filter, storage, and distributor of content related data. The server receives content from the content provider and responds to requests. The server may be independent such as an off site server, or its features may be incorporated into a computer site or into features offered by the present invention.

Subject to the immediately following paragraph, the disclosed embodiment create interests in linked pairs where one interest is positively related to a variable or index (the "Positive Interest") and the other interest of the pair is negatively related to the same variable or index (the "Negative Interest"). While the separate interests which comprise a linked pair are only created by the system in matched pairs (i.e. a Negative Interest is created simultaneous with the creation of a Positive Interest), Negative Interests and Positive Interests are separately tradable following creation by the system. The terms "interest" and "claim" are used herein and are intended to be synonymous with any interest or claim on an issuing entity including shares, certificates, notes, deposits, and derivatives thereof.

Notwithstanding the immediately preceding paragraph, interests under the disclosed embodiment may be created in pairs, triplets, quadruplets or higher order groupings in which one or more interests (with such grouping) possesses a convertibility or conversion feature into one or more interests. Interests with a grouping beyond pairs are consistent with the disclosed embodiment. The detailed description which follows illustrates pairs of interests for clarity. Relating to the pairs, the nomenclature used is "short" or "S" for those interests inversely related to the subject variable or index and "long" or "L" for those interests positively related to the subject variable or index. Two examples of a quadruplets arrangement (i.e. non-pairs) of interest creation and transformation are as follows:

1. Interests are issued in a manner consistent with mutual fund shares in which differing share classes offer different denominations, fees, or loads, but are contractually fungible with each other at pre-determined or otherwise published exchange ratios. Interests in such an example may be configured as S1, S2, L1 and L2 where: (i) the classes designated as 1 are institutional with higher minimum denominations and lower fees, while the classes designated as 2 are non-institutional with lower minimum denominations and higher fees, and (ii) a provision exists within the organization documents of the issuer to exchange the institutional shares and non-institutional shares on a pre-determined or otherwise published exchange ratio (e.g. 1: "n") such as one S1 class for every n S2 classes. In such an embodiment, all of the disclosed processes would apply to either of the class interests, and the exchange ratio would be applied on the system transformed interests.
2. Interests are issued in quadruplets where interests issued as S1, S2, L1, and L2 where "S" is short and "L" is long, and where the accompanying numerical designation indicates applicable leverage. A "1" indicates a one-for-one return relationship with the related index or variable (a singly leveraged interest), and a "2" indicates a leveraged or "two-for-one" leveraged relationship with the related index or variable (a doubly leveraged interest). Where the interests are fungible within the context of exchanges or redemptions and where some quantity of singly leveraged interests are exchangeable or redeemable for some lesser quantity of doubly leveraged interests (e.g. 2 single to 1 double). In such an embodiment, all of the disclosed processes would be applied to all of the numerically designated interests and the exchange ratio would apply to the interests post-system transformation.

The immediately preceding two examples of quadruplet groups are presented as illustrations of embodiments with groupings larger than a pair and are not meant to limit or otherwise preclude embodiments containing other types of higher order groupings with the processes and transformations contained herein.

In the disclosed embodiment, the system continuously monitors the variable or index to which the interests are linked; the subject variable or index may be endogenous or exogenous to the issuing entity. Examples of variables or indices to which interests may be linked are: energy prices, commodity prices, precious metals prices, financial market indices, games of chance, economic data releases, and sporting events.

Figures 2, 3:
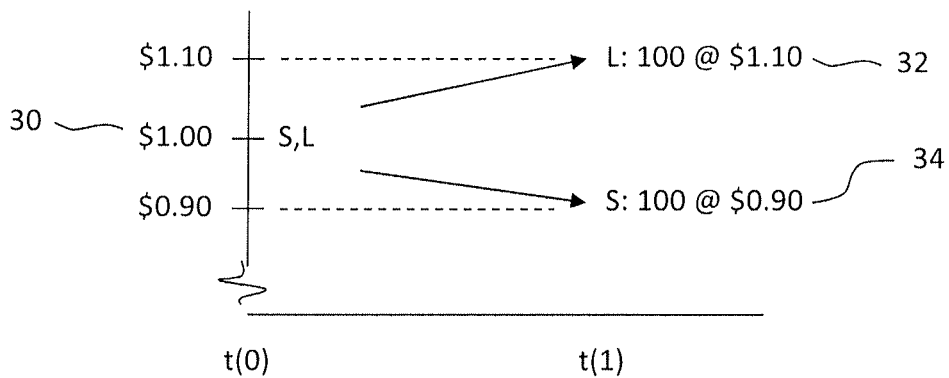
FIG. 2 is a series of exemplary equations utilized by the system in the publication of system generated prices of interests and in the transformation of the interests.
FIG. 3 is a graphic diagram which illustrates one embodiment of the price path of two linked interests over a one-period scenario.

The system monitors the related variable or index for the purposes of publishing system generated prices or values to holders, financial exchanges, regulatory agencies, and other outlets. In some embodiments relating to interests listed on a securities exchange, the system generates and publishes prices on a real-time basis and transmits such prices not less frequently than every fifteen seconds during market hours or with greater frequency depending upon then prevailing exchange rules. FIG. 2 at 27 and 28 illustrates the prices for the Negative (or S or Short) Interests and Positive (or L or Long) Interests respectively.

Further, the system accesses the internally generated prices for the purpose of monitoring differences between system generated interest prices and interest prices based on monitored market transactions between parties unrelated to the issuing entity ("Price Variations"). As more fully described below, the system is capable of performing several types of transformations of the outstanding interests, and the type of transformation effected by the system on any transformation date will be determined by real-time system monitoring of Price Variations if any. If Price Variations occur, the system implements interest transformations which cause a reduction or elimination in Price Variations. More specifically, a system full transformation, as more completely described below, causes all interest types to resolve into an amalgamation of interest types. An interest which is trading in the market at a price higher or lower than the system generated values where the absolute value of the difference exceeds a threshold level input by a system administrator, will be transformed (or resolved) into a matched pair or offsetting interests which will cause the market price of such interests to be driven back to the system generated value.

For clarity of presentation, in the numerical examples presented herein, the costs and fees borne by the issuing entities and attributable to the interests are assumed to be zero unless otherwise indicated. Similarly, ancillary income items relating to any holdings of the issuing entities are also assumed to be zero. System formulas do contains fee variables where indicated. In a preferred embodiment, fees will be accounted for by the system including in the algorithms in FIGS. 2, 8, and 9.

FIG. 1A is an illustration of a balance sheet of a representative issuing entity where immediately preceding the balance sheet preparation, the issuing entity has issued a pair of 100 S (or short) interests and 100 L (or long) interests in consideration for $200 in cash where the issuing price for all interests is $1.00 per unit.

FIG. 1B and FIG. 1C, taken together, is an illustration of multiple issuing entities issuing an interest grouping. FIG. 1B is an illustration of a balance sheet of a representative issuing entity where immediately preceding the balance sheet preparation an issuing entity has issued 100 S (or short) interests. FIG. 1C is an illustration of a balance sheet of a representative issuing entity where immediately preceding the balance sheet preparation an issuing entity has issued 100 L (or long) interests.

FIG. 1D is a diagram which displays one example of a multiple issuing entity organization where a central holding entity is indicated as "H" 23, and where separate issuing entities indicated as "Entity Issuer S" 25 and "Entity Issuer L" 26 are owned and controlled by the common holding entity H 23. The cash or other proceeds from interest issuances are indicated as "Cash or Other Assets" 24 and are aggregated at the common holding company level. One example in which a multiple issuing entity embodiment is preferred is where it is desirable to organize the Entity Issuer S and the Entity Issuer L in differing jurisdictions.

FIG. 2 at 27 and 28 illustrates the system process formulas for generating system prices on the interests, where system prices are stored by the system for access in the monitoring processes (monitoring of deviations between system generated prices and market trading prices) and system prices are transmitted to market exchanges and market participants. The pricing for the interest which is short ("S" or inversely related to) the subject variable is indicated at label Price(S) 27. Similarly, the pricing for the interest which is long ("L" or positively related to) the subject variable is indicated at label Price(L) 28. Further, in preferred embodiments, the matched pairs of short-and-long carry a mathematical identity in that price changes will be equal in magnitude and opposite in direction as indicated in the mathematical identity at 29. It should be noted that in practice, actual market prices for an interest may diverge temporarily from the system generated prices indicated at 27, 28 and 29, however the system monitors such divergences real-time and automatically triggers system remedial processes (as more fully described below) to cause this divergence in market and system prices to be small and short-lived. The system processes calculations relating to the equations on a real time basis. In the system equations indicated in FIG. 2, the system's use of the component variables is as follows:

L=leverage or leverage multiplier relating to the subject variable (e.g. 1, 2, or 3)

VR=the variable or index return or percentage change relating to a determination period (i.e. if the subject variable is oil prices as measured by the WTI (West Texas Intermediate) index and WTI moves from 100 to 110 over the related determination period, VR is +0.10).

SWC=the weighting of the short interests in aggregate relating to their participation in carry of the issuer entity.

SWF=the weighting of the short interests in aggregate relating to their participation in fees of the issuer entity.

LWC=the weighting of the long interests in aggregate relating to their participation in carry of the issuer entity LWF=the weighting of the long interests in aggregate relating to their participation in fees of the issuer entity.

C=any positive or negative carry incurred by the issuer entity and attributable to the interests.

F=any fees attributable to the interests.

The variables Price(S) and Price(L) are used herein to refer to the price generated by the system where such system prices are generated continuously between system transformation dates. Reference to "system generated price" also means prices generated by the system processes. In contrast the terms "trading price" or "trading prices" are used to identify the prevailing market price at which transactors unrelated to the issuer entity are willing buyers and sellers of the interests.

As more fully described below, trading prices may deviate from system generated prices and the disclosed embodiment will implement specific procedures upon the occurrence of such deviations. The reference to Price(S,L) in all instances herein refers to the system generated price on a transformation date; in a preferred embodiment absent corporate actions by the issuer to effect interest splits, reverse splits, or other share adjustments, interest prices for a short interest and long interest upon transformation will be identical. Immediately following a transformation date, system price generation reverts to Price(S) and Price(L), and prices of the distinct interest types may deviate from one another.

FIG. 3 is a graphical example of the interest's system prices where the subject variable has increased 10% over the single determination period. The FIG. 3 graph displays prices on the y-axis indicated at 30, and time on the x-axis where the related determination period is t(0) to t(1). Consistent with the balance sheet illustration at 20 (FIG. 1A), the interests begin at t(0) with prices of $1.00.

Applying the equation at 27 (FIG. 2) to the short interest where: (i) L=1, (ii) VR=0.10, (iii) C=0, and (iv) F=0 is as follows:

$$0.90=1.00\times[1-1\times0.10]+[0],$$

and such value is indicated at 34

Applying the equation at 28 (FIG. 2) to the long interest where: (i) L=1, (ii) VR=0.10, (iii) C=0, and (iv) F=0 is as follows:

$$1.10=1.00\times[1+1\times0.10]+[0],$$

and such value is indicated at 32

The identity at 29 (FIG. 2) is satisfied in that $-1\times[0.90-1.00]$ is equal to $1\times[1.10-1.00]$.

All embodiments of the system include the ability for certain holders to deliver equal amounts of units (or in applicable ratios in the context of triplet or quadruplet issuances) in exchange for the product of (i) the aggregate number of units, and (ii) the average system generated price of the units as of the last price reset (further adjusted for carry and fees if any as more completely covered below, the ability of offsetting interests to be redeemed is part of a successful implementation of the embodiment. Previously known methods have failed because acquiring the offsetting interests for redemption was often too time consuming or too costly. In contrast to previously known methods, the disclosed embodiment automatically causes a holder to have an offsetting group of interests ready for redemption, should market anomalies or material pricing anomalies arise.

Temporarily referring to FIG. 18, the figure illustrates the manner in which the system accepts delivery of an equal quantity of S and L units in exchange for two-times the average price of the S and L units—a paired redemption of interests. As indicated by the mathematical identity at 29 (FIG. 2), the movements in interest's prices are equal and offsetting which means that the average price is a known quantity equal to the last price reset; $1.00 in the example from FIG. 3.

A preferred embodiment will permit certain holders of offsetting instruments to exchange interests with offsetting and variable values for a set amount of cash or value. In contrast to known methods, the disclosed embodiment ensures that a holder of any individual interest will have their interest transformed into a redeemable pair and that such transformation will be effected automatically by the system in response to real-time system monitoring of the difference between market trading prices and system generated prices. This component of the embodiment, in addition to the related processes, addresses a long felt need in the area of investment vehicles where interest realized prices often deviate materially from theoretical (or mathematically determined) prices and where such discrepancies persist to the detriment or benefit of one or more classes of interest holders. Further, because the system has created balanced interests with respect to the related variable or index, the issuing entity is largely immune to changes in the related variable or index, and the issuing entity will not be required to engage in the acquisition of securities or derivatives positions and the issuing entity will not incur the costs and risks associated with holding the securities or derivatives positions and rebalancing them through time as in a conventional exchange traded fund or mutual fund.

System transformations are executed based on system monitored timeframes where a timeframe can be a precise elapsed period of time since the last transformation, an irregular but system determined timetable, or a time based on system monitoring of changes, settings or pricings of the subject variable or index. Examples of system transformations which are triggered by settings or pricings in the subject variable or index are:

1. a traded commodity: the dates and times on which an exchange uses market prices for the settlement of futures or options contracts;
2. a bond or note: the dates and times on which the results of an auction or market poll are released; and
3. a sporting event: the time at which the score of a particular game is made final by recognized officials or a governing body.

The above list is for illustration and not intended to be exhaustive; other embodiments may use other setting and resetting timings.

FIG. 4 continues with the example of a 10% increase in the subject variable or index following the system's transformation of interests. FIG. 4 is a single issuing entity balance sheet prepared after system transformation where the issuing entity performs a mark-to-market on its assets and liabilities. As indicated in the sum product at t(1) FIG. 3, the issuing entity has 100 L interests at an aggregate value of $110 and 100 S interests at an aggregate value of $90. As indicated in FIG. 4, the balance sheet of the issuing entity continues to carry $200 of assets and $200 of liabilities. For the purposes of the example, carrying amounts, fees and costs are assumed to be zero.

The system prices generated in FIG. 3 and shown in FIG. 4 are the system created values. In practice, it is possible for a variety of market forces to cause the trading prices of the interests to deviate from the system created prices. Examples of such market forces are: (i) temporary imbalances in supply and demand, (ii) market surprises including breaking news events, (iii) market technical including scarcity of available share borrow or a disruption in arbitrage mechanics, and (iv) attempts by one or more large trading organizations to inappropriately manipulate market trading prices through abusive practices. Generally, material differences between the system created price and the trading price should be short-lived because market participants, and in particular professional market participants, will pursue arbitrage opportunities in which they sell short the over-priced security and purchase the under-priced security. Unique to the disclosed embodiment, arbitrage is guaranteed by the system transformations.

The disclosed embodiment departs from known methods in that all permutations of deviations between system prices and market prices are remedied through system monitoring and system processes.

Continuing with S and L interests embodiment, there are 8 unique combinations of market-system price differentials. The 8 combinations are listed below in Table 1. In brief, (i) there are two outcomes where one interest's market price is below the system price—rows 1 & 2, (ii) there are two outcomes where one interest's market price is above the system price —rows 3 & 4, (iii) there is one outcome where both interest market prices are above the system prices —row 5, (iv) there is one outcome where both interest market prices are below the system prices —row 6, and (v) there are two outcomes where interest's market price is above the system price at the same time one interest's market price is below the system price —rows 7 and 8.

In Table 1, under the headings "Short Interest" and "Long Interest", the illustrative values are indicated as "m/s" where "m" is the market price and "s" is the system generated price. Under the heading "Arbitrage", the expected arbitrage activity ("Create" or "Redeem"—that is that activity which can be expected to be performed by large or sophisticated transactors of the interests) is indicated in addition to the per share pair arbitrage opportunity (e.g. $0.05 for row 1). The specific numbers presented in the table are for illustration only and are not intended to indicate proposed corrective transformation levels.

TABLE 1

| Price Divergence | Short Interest (m/s) | Long Interest (m/s) | Arbitrage |
|---|---|---|---|
| (1) 1 Interest Low (S) | 0.85/0.90 | 1.10/1.10 | Redeem/$0.05 |
| (2) 1 Interest Low (L) | 0.90/0.90 | 1.05/1.10 | Redeem/$0.05 |
| (3) 1 Interest High (S) | 0.95/0.90 | 1.10/1.10 | Create/$0.05 |
| (4) 1 Interest High (L) | 0.90/0.90 | 1.15/1.10 | Create/$0.05 |
| (5) Both Interests High | 0.95/0.90 | 1.15/1.10 | Create/$0.10 |
| (6) Both Interests Low | 0.85/0.90 | 1.05/1.10 | Redeem/$0.10 |
| (7) 1 High-S/1 Low-L | 0.95/0.90 | 1.05/1.10 | Transformation |
| (8) 1 Low-S/1 High-L | 0.85/0.90 | 1.15/1.10 | Transformation |

Arbitrage Opportunities:

Rows 1 & 2 (Redeem): Where one interest is trading low, a market participant can acquire an interest pair for $1.95 in either scenario ($0.85+$1.10 or $0.90+$1.05) and redeem interests for $2.00 for a $0.05 profit opportunity. This activity is expected to increase the demand for both interests.

Rows 3 & 4 (Create): Where one interest is trading high, a market participant can cause the system to create interests for $2.00 and sell the pair for $2.05 in proceeds in either scenario ($0.95+$1.10 or $0.90+$1.15) for a $0.05 profit opportunity. This activity is expected to increase the supply of both interests.

Rows 5 (Create): Where both interests are trading high, an authorized participant can create interests for $2.00 and sell the pair for $2.10 in proceeds ($0.95+$1.15) for a $0.10 profit opportunity. This activity is expected to increase the supply of both interests.

Rows 6 (Redeem): Where both interests are trading low, a market participant can acquire a pair of interests for $1.90 ($0.85+$1.05) and redeem the pair for $2.00 for a $0.10 profit opportunity. This activity is expected to increase the demand for both interests.

System Full Transformations:

Rows 7 & 8 (Transformation): Where one interest within the pair is trading low and the other interest within the pair is trading high, a basic arbitrage (Redeem or Create) may not be possible because the sum of the pair's market prices present no divergence from the sum of system prices (even though both interests may carry a material deviation from system prices). It is the scenarios indicated in Rows 7 & 8 which may require an automated system full transformation (where divergence exceeds an administrator preset trigger), as the create and redeem (i.e. arbitrage) mechanisms are insufficient to correct this anomaly—the disclosed embodiment is unique in comparison with previously known system in curing this deficiency.

In a preferred embodiment, in addition to the scenarios indicated in Table 1 Rows 7 and 8, an automated system full transformation would be triggered if any of the divergences listed in Table 1, Rows 1-6, where the divergence exceeds an administrator preset trigger.

FIG. 5A continues the example of a one-period, up 10% scenario. The short (S) interest and long (L) interest are depicted as bars in a histogram 50 where the short interest is indicated by the bar labeled S 51, and the long interest is indicated by the bar labeled L 52. The values are indicated on the y-axis where the short interest maps to a value of 90 (indicating a loss of 10) and the long value maps to a value of 110 (indicating a gain of 10)—recall that at FIG. 1 100 long and 100 short interests were issued for $1.00 per interest for a beginning value of $100 for each of the interests. The value differential between the interests following the single period, index up 10%, example is $20 as indicated at 55 (FIG. 5A) as the difference between 110 and 90.

Moving to FIG. 5B, the histogram illustrates a system partial transformation of short (S) and long (L) interests in the up 10% scenario. FIG. 5B presents a simplified demonstration of a partial system transformation (FIG. 8 and FIG. 9 contain the full system algorithms).

Continuing with the FIG. 5B example, and recalling that the system will (i) create an equal amount of short and long interests on a transformation date, and (ii) set the prices for the short and long interests to be equal on a transformation date (i.e. the previously defined P(S,L)). Further, because the system will cause additional interests to be distributed to that interest holding associated with the favorable index movement (i.e. there will be an increase in the number of outstanding interests overall), and in a preferred embodiment, the system will set all interest prices in a pairing to the pre-transformation minimum price in order to calculate the additional interests to be created as illustrated below. The example in FIG. 5B and specifically the partial transformations is algebraically illustrated for a single short (S) holder and a single long (L) holder as:

short holder: [100 $S$ Interests]×$0.90=$90

The short holder's original holding and the prevailing price of short interests result in a short holder value of $90 (consistent with the pre-transformation condition) requiring no system adjustments. Further, in a partial transformation, only the interests associated with the favorable variable or index move are transformed by the system, and the short interest experienced an adverse move in the example.

long holder transformation: [100 $L$ Interests]×$0.90+ [$L'$×$0.90]+[$S'$×$0.90]=$110

Because a system transformation will not change the value of a holder's position, but only the composition, the above equation states that the sum of (i) the value of the original 100 interests, plus (ii) the value of a system determined number of newly created L or long interests—L', plus (iii) the value a system determined number of newly created S interests or short interests—S' will all equal $110, the pre-transformation value. Since the system will only create interests of a pair in equal numbers, L' and S' must be equal in value, and the equation can be reduced as follows:

long holder transformation: [100 $L$ Interests]×$0.90+ [2×$L'S'$×$0.90]=$110 long holder transformation: $90+[2×$L'S'$×$0.90]=$110 long holder transformation: $L'S'$=$20/$1.80=11.1111

The system will create 11.111 long interests and 11.111 short interests, all distributed to the holders of long interests. Referring to FIG. 5B, the graphical depiction of the system partially transformed long interest is reflected in (i) the original 100 long interests 57, (ii) the system created additional 11.111 long interests 58, and (iii) the system created additional short interests 59 taken together represent the post-partial transformation.

In a partial system transformation the interest subject to an adverse move (S in FIG. 5B 56) is not transformed, the original interest count (e.g. 100) of the interest holding subject to a favorable move (L in FIG. 5B 57) is not transformed, but the excess value of the interest subject to a favorable move is transformed (the excess of L over S in FIG. 5B 58, 59).

Moving to FIG. 5C, the histogram illustrates a system full transformation of short and long interests in the same up 10% scenario. In contrast to the partial transformation depicted in FIG. 5B, a system full transformation will result in the entirety of each interest being transformed by the system into an amalgamation of balanced interests (i.e. the entirety of all interests rather than the differential between matched or grouped interests). The S interest 61 is fully transformed into a balance of 50% 5 and 50% L interests and can be contrasted with the S interest in the partial transformation 56. The base amount of the L interest 62 is transformed into a balance of 50% 5 and 50% L and can be contrasted with L interest in the partial transformation 57. The differential amount between the interests of 20 indicated in FIG. 5C is transformed identically to the partial transformation and indicated at FIG. 5C 58 and 59.

In a preferred embodiment, based on real-time system monitoring, the system automatically performs either a partial transformation or a full transformation based on real-time system measurements. The system performs real-time measuring and monitoring of the differential between: (i) system generated prices consistent with the algorithms in FIG. 2 and (ii) the actual trading prices of interests as reported on exchanges, through electronic financial pricing networks, and as reported to regulatory reporting systems. If the deviation for any of the interests exceeds a pre-determined threshold amount for a pre-determined period of time, the next following system transformation is a full transformation. Such next system transformation may occur based on a normative transformation schedule or may be accelerated. Examples of price values experiencing a pre-determined deviation for a pre-determined period of time are: (i) system and market values deviate by more than 1% for three or more consecutive market closes, (ii) system and market values deviate by more than 3% at any single market close—these triggers may be used in combinations. In preferred embodiments, the predetermined deviations and predetermined period of time will change at any transformation date if market conditions have changed materially. Examples of such changes are (i) the frequency of occurrence of large market moves, and (ii) an overall increased market volatility.

Figure 6:
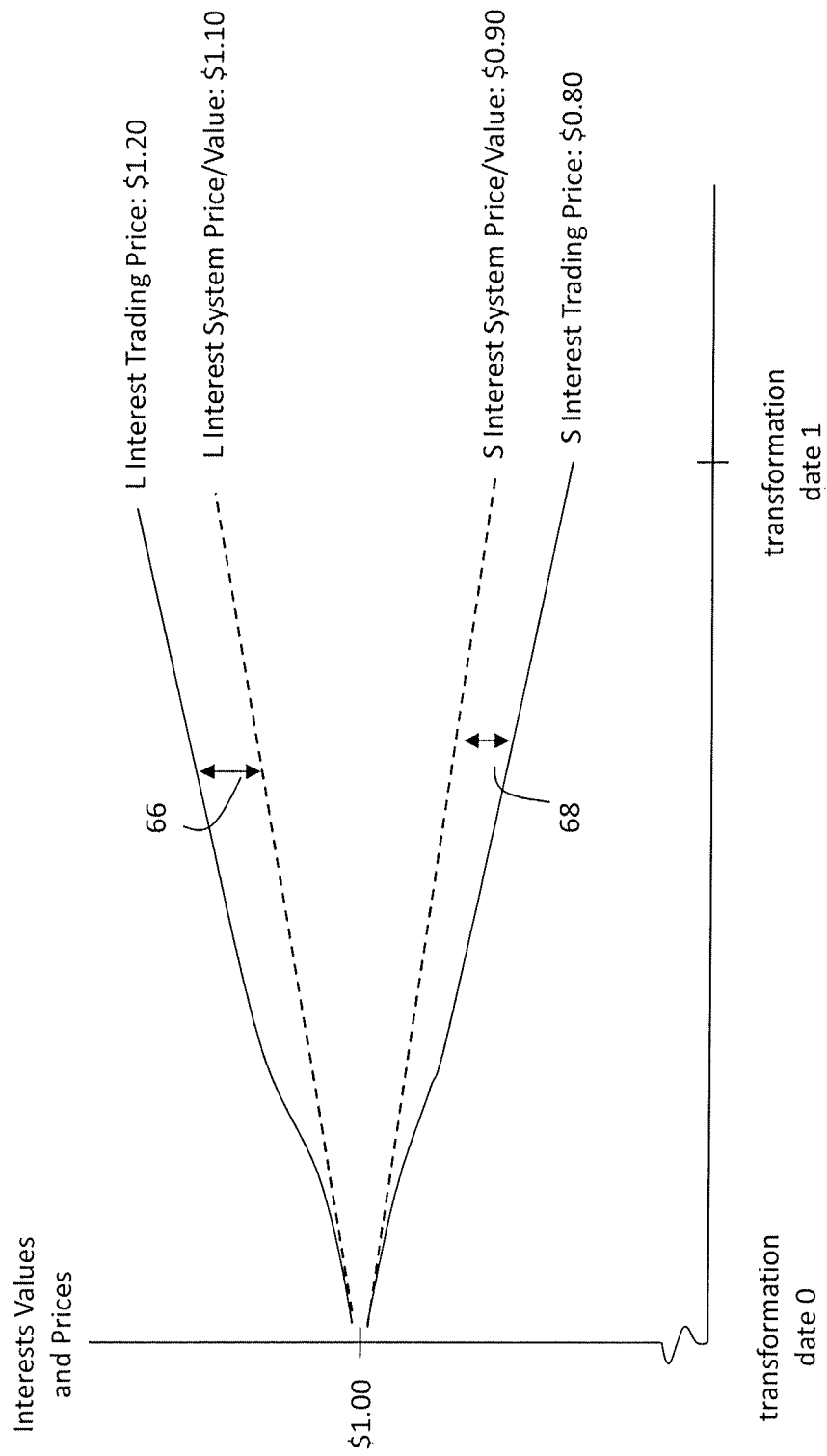
FIG. 6 is a graphic diagram of interest's prices over time where interest trading prices and interest system generated prices deviate.

FIG. 6 displays the occurrence of a system measured variation between system generated prices and interest trading prices. In FIG. 6, price levels are indicated on the y-axis and time is indicated on the x-axis.

In FIG. 6, the dashed lines indicate the system generated prices of the L and S interests where the related index is subject to an even and continuous move from 100 to 110. Consistent with the above example, the system generated price level of the L interest finishes at 1.10 and the system generated price level of the S interest finishes at 0.90. In the scenario depicted in FIG. 6, price levels indicated on exchanges are shown by the solid lines labeled "L Interest Trading Price" and "S Interest Trading Price". Indicated at points 66 and 68, the market prices have deviated from the system generated prices, and the differential persists to transformation date 1 where the market prices for both interests deviate from system generated prices by 0.10. As indicated in FIG. 6, the L interest possesses a trading price in excess of the system generated price and the S interest has a trading price below the system generated price. Known methods do not have a system correcting action to cure the type of deviation depicted in FIG. 6.

Continuing with reference to FIG. 6, in preferred embodiments, the occurrence of the price deviations at 66 and 68 automatically cause the system to implement a full transformation of the interests. Further, in some embodiments, if the deviations at 66 and 68 are measured by the system are material in magnitude, the system automatically advances the timing of the next following transformation date, shortening the time to the next system transformation.

Upon the occurrence of market anomalies, exchange errors and market disruption events (collectively events largely consistent with the implementation of conventional circuit breakers on financial exchanges in the U.S.), the administrator for the fund may force a system triggering of a full transformation.

Figure 7A:
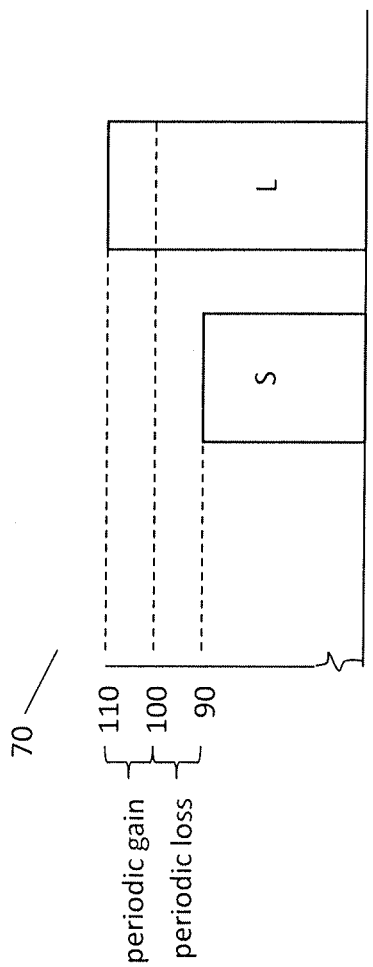
FIG. 7A is a graphic diagram which illustrates interests where the related variable or index has increased 10%.
Figure 7B:
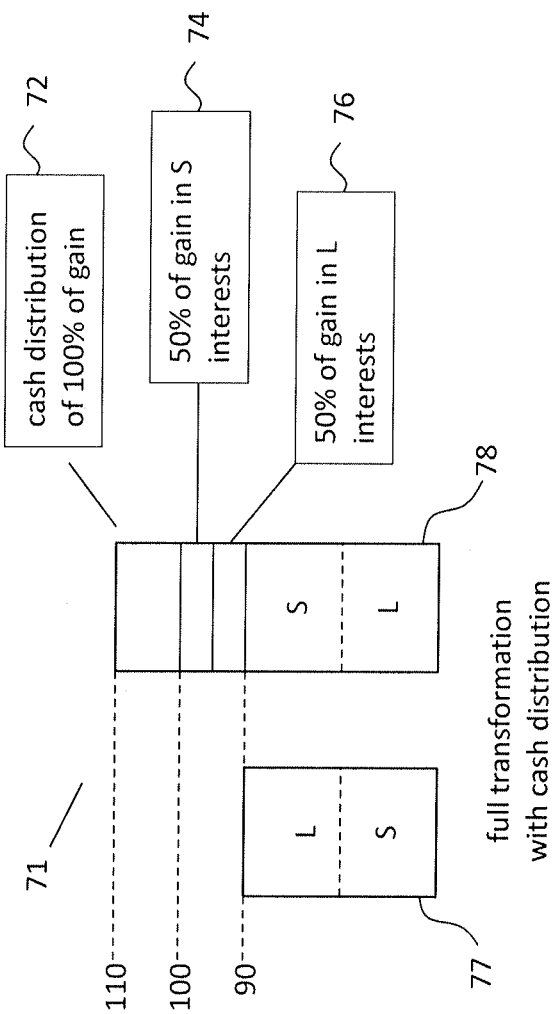
FIG. 7B is a graphic diagram which illustrates a system full transformation with cash distributions where the related variable or index has increased 10%.

FIG. 7A and FIG. 7B continue the example of a one-period, up 10% scenario. FIGS. 7A and 7B are distinguished from FIGS. 5A, 5B, and 5C in that FIGS. 7A and 7B illustrate a system full transformation with cash distributions related to the gain component.

The short (S) interest and long (L) interest are depicted as bars in a histogram 70 where the short interest is indicated by the bar labeled S, and the long interest is indicated labeled L. The values are indicated on the y-axis where the short interest maps to a value of 90 (indicating a loss of 10) and the long value maps to a value of 110 (indicating a gain of 10). The value differential between the interests following the single period, index up 10%, is 20 as indicated at 55 (FIG. 5) and is equal to the difference between 110 and 90.

The system converts the value differential of 20 indicated at 55 into (x) a cash distribution equal to the gain associated with such interest; $10 in the example as indicated at 72, and (y) 50% of an S (or short) interest as indicated at 74 with such amount being equal to the one-half of the amount at 55 minus the amount at 72 and (z) 50% of an L (or long) interest as indicated at 76 with such amount being equal to one-half of the amount at 55 minus the amount at 72. The base amounts of $90 indicated at points 77 and 78 are transformed identically to a full transformation as indicated at FIG. 5, 60.

Temporarily referring back to FIGS. 5A through 5C and in contrast with the cash distributions identified in FIGS. 7A and 7B (i.e. cash distribution based on an interest's absolute gain), an administrator of the system may set a threshold level to be stored and accessed by the system where any interest distribution below such threshold level will ultimately be satisfied with cash. Using the example in FIG. 5B, if the administrator set such threshold level at 25 units of interest, the issuer entity will ultimately deliver cash to holders rather than interests for an amount equal to $20—the value of the entire distribution. In a preferred embodiment, the cash distribution will be effected through the creation of immediately redeemable interests where the interests indicated at FIG. 5B 58 and 59 are immediately redeemable for cash; for the avoidance of doubt, the system will perform the same intermediate steps as indicated for FIGS. 5A and 5B.

FIG. 8 lists the algorithms utilized by the system for interests transformation where a transformation is effected only with interests (i.e. there are no cash distributions). The system transformation algorithms are presented here in FIG. 8, and the system transformation algorithms are utilized in a multi-period simulation in FIGS. 10 and 11.

In some embodiments the system transformation of the interests will be effected through a physical or electronic transformation of such interests held physically or in electronic book-entry form. In other embodiments the system transformation will be effected through synthetic means where a fluctuating contract or system-specific booking system is used, such as in the books and records of a mutual fund company.

Beginning at the top of FIG. 8, the algorithms for determining the price of an S interest and an L interest are indicated at 27 and 28 respectively and are repeated here for ease of reviewing the transformation algorithms. Depending upon the environment in which the system is implemented, Price (S) and Price(L) may be subject to rounding or truncation for reporting purposes. If currently listed in a public securities exchange in the U.S., Price(S) and Price(L) may be published to a maximum precision of four decimal places (i.e. as denominated in U.S. dollars, Price(S) and Price(L) must be rounded or truncated to 1/100th of 1 cent).

The transformation values (or TV) for the S and L interests are indicated at 81, where TV(S) produces the transformation value for an S interest and TV(L) produces the transformation value for an L interest. TV(S) and TV(L) are values denominated in the currency in which Price(S) and Price(L) are denominated.

The transformation units (or TU) for the S and L interests are indicated at 82, where TU(S) produces the transformation units for an S interest and TU(L) produces the transformation units for an L interest. Transformation units are denominated in the divisible quantities which an interest can be held (e.g. 1 interest or share). In some implementations, the transformation units are required to be whole values (i.e. no fractional units), and in such implementations transactional units may be rounded down or up to the nearest full unit. In such non-fractional implementations, compensating cash distributions may be employed to make up the differences in transformation values between the systems generated fractional value and the whole value delivered.

The units (or U) for the S and L interests is indicated at 83, where U(S) produces the units for the S interest and U(L) produces the units for the L interests.

Continuing with FIG. 8, under a system partial transformation (as diagrammed at FIG. 5B) the algorithms used by the system to transform the interests are indicated at 84. Under the title "Short Interests", the top two algorithms are used by the system to transform an S interest and $S_t$ indicates the number of resultant S interests and $L_t$ indicates the resultant L interests. Under the title "Long Interests", the two algorithms are used by the system to transform an L interest and $S_t$ indicates the number of resultant S interests and $L_t$ indicates the resultant L interests.

Continuing with FIG. 8, under a system full transformation (as diagrammed at FIG. 5C), the algorithms used by the system to transform the interests are indicated at 85. Under the title "Short Interests", the top two algorithms are used by the system to transform an S interest and $S_t$ indicates the number of resultant S interests and $L_t$ indicates the resultant L interests. Under the title "Long Interests", the two algorithms are used by the system to transform an L interest and $S_t$ indicates the number of resultant S interests and $L_t$ indicates the resultant L interests.

Continuing with FIG. 8, the system generates a post-transformation price for the interests and such post-transformation price will apply to both interests. The post-transformation price, $Price(S,L)_t$ is indicated at 86.

The algorithms listed in FIG. 8 are applied to system simulation examples in FIGS. 10 and 11.

FIG. 9 lists the algorithms utilized by the system for interests transformation where a transformation is effected with both interests and cash distributions; the absolute value of the gain computed by the system is comprised of cash, and the remainder of the relative pair differential is comprised of interests. FIG. 9 (algorithms utilized by the system in the context of system computed absolute gains comprised of cash) is contrasted with FIG. 8 in that the algorithms contained in FIG. 8 are used by the system when (i) no first order cash distributions are made or (ii) only cash distributions are made where the system has performed the interim step of determining pro-form a distributable units and where the pro-form a units are immediately redeemable for cash. The system transformation algorithms presented here in FIG. 9, are utilized in a multi-period simulation in FIG. 12.

Beginning at the top of FIG. 9, the algorithms for determining the price of an S interest and an L interest are indicated at 27 and 28 respectively and are repeated here for ease of reviewing the transformation algorithms. Prices relating to the FIG. 9 will be subject to the same truncations and roundings described with respect to FIG. 8.

The distribution values (or D) for the S and L interests are indicated 92, where D(S) produces the distribution value for the S interest and D(L) produces the distribution value for the L interest; each a first order cash distribution.

The post-distribution price, Price'(S,L) is indicated at 93, and Price'(S,L) is the interests price level used by the system during a transformation.

The transformation values (or TV) for the S and L interests are indicated at 94, where TV(S) produces the transformation value for an S interest and TV(L) produces the transformation value for an L interest. TV(S) and TV(L) are values denominated in the currency in which Price(S) and Price(L) are denominated.

The transformation units (or TU) for the S and L interests is indicated at 95, where TU(S) produces the transformation units for an S interest and TU(L) produces the transformation units for an L interest. Transformation units are denominated in the divisible quantities which an interest can be held (e.g. 1 interest or share). In certain preferred embodiments, the transformation units will be required to be whole values (i.e. no fractional units), and in such implementations transactional units may be rounded down or up to the nearest full unit. In such non-fractional implementations, compensating cash distributions may be employed to make up the differences in transformation values where such amount is equal to positive difference between (x) the system generated fractional value and (y) the whole-units value delivered.

The units (or U) for the S and L interests is indicated at 96, where U(S) produces the units for the S interest and U(L) produces the units for the L interests.

Continuing with FIG. 9, under a system full transformation (as diagramed at FIG. 7B), the algorithms used by the system to transform the interests are indicated at 97. Under the title "Short Interests", the top two algorithms are used by the system to transform an S interest and $S_t$ indicates the number of resultant S interests and $L_t$ indicates the resultant L interests. Under the title "Long Interests", the two algorithms are used by the system to transform an L interest and $S_t$ indicates the number of resultant S interests and $L_t$ indicates the resultant L interests.

Continuing with FIG. 9, the system generates a post-transformation price for the interests and such post-transformation price will apply to both interests. The post-transformation price, Price(S,L)$_t$ is indicated at 98.

The algorithms listed in FIG. 9 are applied to system simulation in FIG. 12.

FIGS. 10, 11 and 12 each demonstrate a three period simulation of the system with respect to the transformation of interests. FIG. 10 illustrates a system partial transformation for each period, FIG. 11 illustrates a system full transformation for each period, and FIG. 12 illustrates a system full transformation with cash distributions for each period. Line items within the figures are labeled to follow the system algorithms in FIGS. 8 and 9. Columns represent the periods as labeled.

FIG. 10 demonstrates a three period simulation, and as indicated in row 3, the index begins at 100, and carries a value on each transformation date of 110, 121, and 114.95 for transformation dates 1, 2, and 3 respectively. The returns indicated in row 2 are +10%, +10%, and −5% respectively for each period and are calculated by the fraction (i) the difference in the index value from the immediately preceding period, over (ii) the index value in the immediately preceding period.

Continuing with FIG. 10 at rows 4, 5 and 6, the simulation is consistent with the earlier example in that the system begins with 100 S interests, 100 L interests and a price at inception of 1.00. Note that rows 4 through 6 label items as "Open" which indicates the beginning of a period prior to the index movement and prior to transformation.

Continuing with FIG. 10 at rows 7 and 8, the system indicates the closing prices for the interests as Price(S) for the short interest and Price (L) for the long interest. The applicable system algorithm is indicated at 27 for the S interests and 28 for the L interests and inputting values for the first period is illustrated below; for clarity L is assumed 1, and C (carry) and F (fees) are assumed zero.

$$\text{Price}(S)_t = \max\{0,100\times[1-1\times0.10]+[0]\}=0.90$$

$$\text{Price}(L)_t = \max\{0,100\times[1+1\times0.10]+[0]\}=1.10$$

Continuing with FIG. 10 at rows 9 and 10, the system indicates the transformation value for the interests as TV(S) for the short interest transformation value and TV(L) for the long interest transformation value. The applicable system algorithms are indicated at 81 in FIG. 8. Inputting values into the algorithms creates the following results:

$$TV(S)_t = \max[0,(0.90-1.10)]\times100=0$$

$$TV(L)_t = \max[0,(1.10-0.90)]\times100=20$$

Continuing with FIG. 10 at rows 11 and 12, the system indicates the transformation units for the interests as TU(S) for the short interest transformation units and TU(L) for the long interest transformation units. The applicable system algorithms are indicated at 82 in FIG. 8. Inputting values into the algorithms creates the following results:

$$TU(S)_t = 0/\min[0.90,1.10]=0$$

$$TU(L)_t = 20/\min[0.90,1.10]=22.2222 \text{ (truncated to 4 decimals)}$$

Continuing with FIG. 10 at rows 13 and 14, the system indicates the aggregate units count for the interests as U(S) for the short interests count and U(L) for the long interests count. The applicable system algorithms are indicated at 83 in FIG. 8. Inputting values into the algorithms creates the following results:

$$U(S)_t = 100+0=100$$

$$U(L)_t = 100+22.2222=122.2222$$

Continuing with FIG. 10 at rows 15 and 16, the system indicates the transformation of the S units which were outstanding at the opening of the related period (100 as indicated at row 4). Row 15, is determined by the first algorithm indicated at 84 in FIG. 8, and row 16 is determined by the second algorithm indicated at 84 in FIG. 8, such that rows 15 and 16 indicated the manner in which the system transforms the S interests for the related period where row 15 contains the resultant S interests and row 16 contains the resultant L interests. Inputting values into the algorithms creates the following results:

$$S_t=100+0.5\times0=100$$

$$L_t=0+0.5\times0=0$$

Continuing with FIG. 10 at rows 17 and 18, the system indicates the transformation of the L units which were outstanding at the opening of the related period (100 as indicated at row 5). Row 17, is determined by the third algorithm indicated at 84 in FIG. 8, and row 18 is determined by the fourth algorithm indicated at 84 in FIG. 8, such that rows 17 and 18 indicated the manner in which the system transforms the L interests for the related period where row 17 contains the resultant S interests and row 18 contains the resultant L interests. Inputting values into the algorithms creates the following results:

$$S_t=0+0.5\times22.2222=11.1111$$

$$L_t=100+0.5\times22.2222=111.1111$$

The 100 S interests are transformed into (i) 100 S interests, (ii) 0 L interests. The 100 L interests are transformed into (i) 11.1111 S interests, and (ii) 111.1111 L interests. FIG. 10, row 19 aggregates all of the interests for a sum of 222.2222 which represents the aggregate sum of all S and L interests immediately following transformation.

Continuing with FIG. 10, at row 20, the price immediately following transformation is calculated as indicated by the algorithm at FIG. 8 86, Price(S,L)t. Inputting values into the algorithm at 86 created the following result:

$$Price(S,L)_t=200/[111.1111+111.1111]=0.9000$$

For clarity, it is assumed that no additional interests have been either created or redeemed since inception and that ancillary cash adjustments relating to carry and fees is zero, so the cash amount in the issuer entity is 200 and consistent with the presentation in FIG. 4.

To check that the system has produced the appropriate returns for each interest through the system transformation, the following calculations indicate the final value holdings of all of the S interests and the final value holdings of all of the L interests. Reference is made back to rows 7 and 8 where it can be indicated that a holder of all of the S interests should have a final value of 90 (100×0.90) and a holder of all of the L interests should have a final value of 110 (100×1.10).

Beginning with the S interests:
(i) 100 S interests are transformed into 100 S interests and 0 L interests
(ii) the price of an S interest at inception of the period is 1.00
(iii) the price is an S interest at close of the period is 0.90
(iv) the index return is +10%, and the S interest is inversely related to the index return $$S\ return:\ [((100\times0.90)-(100\times1.00)]/[100\times1.00]=-0.10\ or\ minus\ 10\%$$

Moving to the L Interests:
(i) 100 L interests are transformed into 11.1111 S interests and 111.1111 L interests
(ii) the price of an L interest at inception of the period is 1.00
(iii) the price is an S and an L interest at close of the period is 0.90

(iv) the index return is +10%, and the L interest is positively related to the index return $$L\ return:\ [\{(11.1111\times0.90)+(111.1111\times0.90)\}-(100\times 1.00)]/[100\times1.00]+0.10\ or\ plus\ 10\%$$

The values for other periods in FIG. 10 are processed in an identical manner to the first period.

It should be noted that while the immediately preceding numerical illustration can be demonstrated by hand calculations in a limited and stylized example, implementation of the embodiment will entail performing the processes over thousands of interests with index values moving continuously.

Similar to FIG. 10, FIG. 11 demonstrates a three period simulation. FIG. 11 demonstrates a system full transformation of interests rather than the system partial transformation demonstrated in FIG. 10. The format of FIG. 11 is identical to that of FIG. 10.

In FIG. 11, the values for rows 1 through 14 are identical to those of FIG. 10, and the process for each value is also identical to the process demonstrated in the context of FIG. 10. Beginning with row 15, FIG. 11 (and the system full transformation) departs from the demonstration in FIG. 10. Similarly, the algorithms at FIG. 8 85 are substituted for the algorithms at FIG. 8 84 in the context of a system full transformation.

Moving to FIG. 11, row 15, the S and L interests are transformed under a process indicated at FIG. 8 85. Inputting values into the algorithm at 85 creates the following result:

For the S interest at rows 15 and 16:

$$S_t=0.5\times100+0.5\times0=50$$

$$L_t=0.5\times100+0.5\times0=50$$

For the L interest at rows 17 and 18:

$$S_t=0.5\times100+0.5\times22.2222=61.1111$$

$$L_t=0.5\times100+0.5\times22.2222=61.1111$$

As indicated in rows 15 and 16, the 100 S interests are transformed into (i) 50 S interests, (ii) 50 L interests. As indicated at rows 17 and 18, the 100 L interests are transformed into (i) 61.1111 S interests, and (ii) 61.1111 L interests. FIG. 11, row 19 aggregates all of the interests for a sum of 222.2222 which represents the aggregate sum of all S and L interests immediately following transformation.

Continuing with FIG. 11, at row 20, the price immediately following transformation is calculated as indicated by the algorithm at FIG. 8 86, Price(S,L)t. Inputting values into the algorithm at 86 creates the following result:

$$Price(S,L)_t=200/[111.1111+111.1111]=0.9000$$

For clarity, it is assumed that no additional interests have been either created or redeemed unrelated to the initial interests and that ancillary cash adjustments relating to carry and fees is zero, so the cash amount in the issuer entity is 200 and consistent with the presentation in FIG. 4.

To check that the system has produced the appropriate returns for each interest through the system transformation, the following calculations indicate the final value holdings of all of the S interests and the final value holdings of all of the L interests. Reference is made back to rows 7 and 8 where it can be indicated that a holder of all of the S interests should have a final value of 90 (100×0.90) and a holder of all of the L interests should have a final value of 110 (100×1.10).

Beginning with the S Interests:
(i) 100 S interests are transformed into 50 S interests and 50 L interests
(ii) the price of an S interest at inception of the period is 1.00

(iii) the price is an S and an L interest at close of the period is 0.90

(iv) the index return is +10%, and the S interest is inversely related to the index return $$S \text{ return: } [\{(50 \times 0.90) + (50 \times 0.90)\} - (100 \times 1.00)] / [100 \times 1.00] = -0.10 \text{ or minus } 10\%$$

Moving to the L Interests:

(i) 100 L interests are transformed into 61.1111 S interests and 61.1111 L interests (ii) the price of an L interest at inception of the period is 1.00

(iii) the price is an S and an L interest at close of the period is 0.90

(iv) the index return is +10%, and the L interest is inversely related to the index return $$L \text{ return: } [\{(61.1111 \times 0.90) + (61.1111 \times 0.90)\} - (100 \times 1.00)] / [100 \times 1.00] = +0.10 \text{ or plus } 10\%$$

The values for other periods in FIG. 11 are processed in an identical manner to the first period.

FIG. 12 demonstrates a three period simulation, and as indicated in row 3, the index follows begins at 100, and carries a value on each transformation date of 110, 121, and 114.95 for transformation dates 1, 2, and 3 respectively. The returns indicated in row 2 are +10%, +10%, and −5% respectively for each period and are calculated by the fraction (i) the difference in the index from the immediately preceding period, over (ii) the value in the immediately preceding period.

FIG. 12 demonstrates a system full transformation with interest and cash distributions, and the demonstration in FIG. 12 is based on the system algorithms in FIG. 9.

In FIG. 12, the values for rows 1 through 8 are identical to those of FIGS. 10 and 11, and the process for each value is also identical to the process demonstrated in the context of FIG. 10. Beginning with row 9, FIG. 12 (and the system full transformation with cash distributions) departs from the demonstration in FIG. 11. Similarly, the algorithms of FIG. 9 are substituted for the algorithms of FIG. 8 in the context of a system full transformation with cash distributions.

The system full transformation will be a preferred embodiment in implementations in which it is desirable to make non-interest distributions relating to favorable index or variable moves and in implementations in which it is desirable to generate fewer interests through the transformation process.

Continuing with FIG. 12 at rows 9 and 10, the system determines the cash distribution applicable to the interests using the algorithms D(S) and D(L) indicated in FIG. 9 at 92 where D(S) indicates the distribution for an S interest and D(L) indicates the distribution for an L interest. Inputting values into the algorithms is as follows:

$$D(S)_t = \max[0, 100 \times (0.90 - 1.00)] = 0$$

$$D(L)_t = \max[0, 100 \times (1.10 - 1.00)] = 10$$

The system indicator at row 11 displays that interest which receives the cash distribution and it is indicated as L for period 1.

Continuing with FIG. 12 at row 12, the system calculates a post-cash distribution price indicated as Price(S,L) where the price for S and L interests is identical and equal to Price(S,L) immediately following system transformation. It should be noted that prior to system transformation, the prices for the S and L interests may differ and that those values are indicated at rows 7 and 8. The system accesses the algorithm at FIG. 9 at 93 for the Price(S,L) algorithm and inputting values is as follows:

$$\text{Price'}(S,L)_t = 1.00 - [2 \times (0 + 10)] / [100 + 100] = 0.90$$

Continuing with FIG. 12 at rows 13 and 14, the system calculates the transformation values for the S and L interests by reference to the algorithm 94 in FIG. 9. Inputting values is as follows:

$$TV(S)_t = \max[0, (0.90 - 1.10) \times 100 - 0] = 0$$

$$TV(L)_t = \max[0, (1.10 - 0.90) \times 100 - 10] = 10$$

Continuing with FIG. 12 at rows 15 and 16, the system calculates the transformation units for the S and L interests by reference to the algorithm 95 in FIG. 9. Inputting values is as follows:

$$TU(S)_t = 0 / 0.90 = 0$$

$$TU(L)_t = 10 / 0.90 = 11.1111 \text{ (truncated to 4 decimal places)}$$

Continuing with FIG. 12, the system transformation of the S interests is reported in rows 17, 18, and 19. The S interests are transformed into a combination of S and L interests based on the system algorithm at FIG. 9 at 97. Inputting values is as follows:

$$S_t = 0.5 \times [100 \times 0.90 - 0] / 0.90 = 50$$

$$L_t = 0.5 \times [100 \times 0.90 - 0] / 0.90 = 50$$

Cash Distribution at row 19 equals D(S)t from row 9 and is equal to 0.

Continuing with FIG. 12, the system transformation of the L interests is reported in rows 20, 21, and 22. The L interests are transformed into a combination of S and L interests based on the system algorithm at FIG. 9 97. Inputting values is as follows:

$$S_t = 0.5 \times [100 \times 1.10 - 10] / 0.90 = 55.5555 \text{ (truncated to 4 decimal places)}$$

$$L_t = 0.5 \times [100 \times 1.10 - 10] / 0.90 = 55.5555 \text{ (truncated to 4 decimal places)}$$

Cash Distribution at row 22 equals D(L)t from row 9 and is equal to 10.

Indicated at row 23, the total cash equals the cash from the immediately preceding period (200 in the example) minus the sum of the cash distributions [D(S)t+D(L)t or 10] equal to a value of 190.

The total interests at row 24 equal the total S and L interests post-transformation which equals the sum of rows 17, 18, 20, and 21 which is equal to 211.1111.

The interest price at row 25 is equal to the price determined at row 12, Price'(S,L)t, the post-distribution price. As indicated at period 2, column 6, the price of 0.90 is carried into the subsequent period as the opening price.

FIG. 13 demonstrates how a holder entering the system at any period will receive a precise and accurate return and the numbers are run based on a partial transformation based on the scenarios depicted in FIG. 10. In each row of 1L, 1S, 2L, 2S, 3L and 3S, the numerical designation indicates the period of the holding and the letter designation indicates the interest as either S or L. "2S" indicates a single period holding of an S interest during the second period. As indicated in the column entitled "per Unit", each calculation is based on a holding of 10 interests or units, and as indicated in the column entitled "Open Value", the price from FIG. 10 row 6 is applied to the 10 units; the invested amount for each row/scenario is that value indicated under the column heading "Open Value".

The columns entitled "Longs", "Shorts", and "Dividend" show the interest transformation in each row/scenario. For example in the period 3 scenario, 10 S interests with an aggregate value of $8.10 are transformed into 0.5263 L interests and 10.5263 S interests under a system partial transformation when the index or variable movement has been −5% as indicated for the third period in FIG. 10 (see row 2). Under the heading "Value", the sum value of the port-transformation interests is reported, and continuing with row/scenario 3S, the closing price is 0.7695 (see also FIG. 10, row 20) and the applicable value is 0.7695×[0.5263+10.5263] which equals 8.505 which is the value reported in the table. The values under the column entitled "Realized Return" indicate the percentage change from column "Open Value" to "Value", and continuing with the row/scenario 3S, the value is calculated as [8.505-8.10]/8.10 which is equal to 0.05 or 5%. Because the 3S row/scenario indicates a short interest, its realized return should be inverse of actual index or variable return which is displayed in the last column under the heading "Index Return".

As indicated in the 2 rightmost columns of FIG. 13, for each single period holding, the post-transformation values produce the correct return. For each incidence of an L interest the Realized Return equals the Index Return, and for each incidence of an S interest the Realized Return equals the inverse of (or −1 times) the Index Return.

Figure 14:
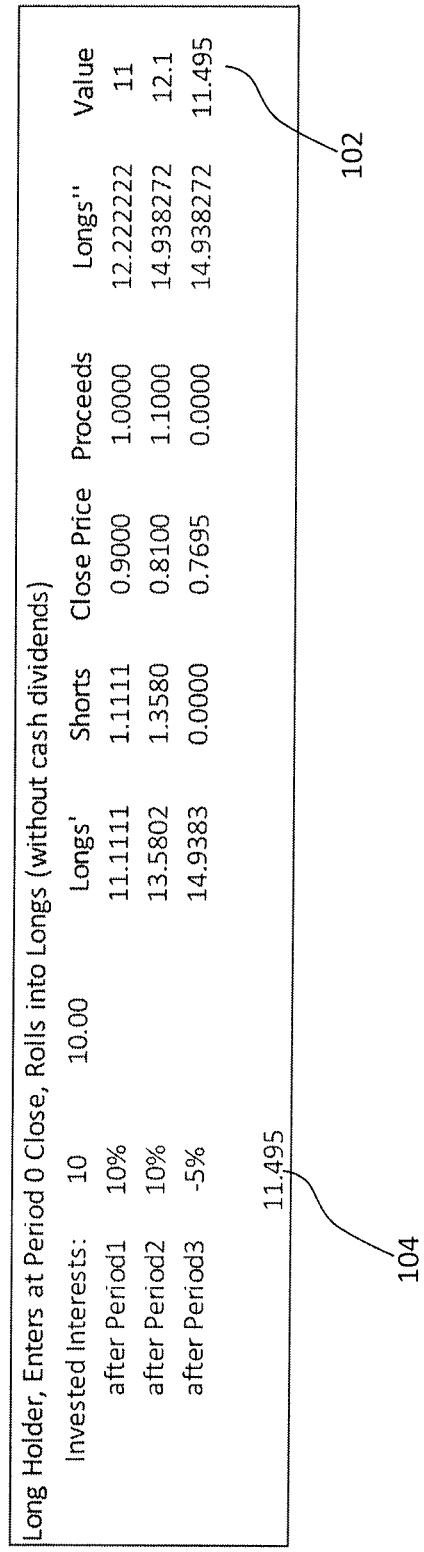
FIG. 14 is a table illustration of a cumulative multi-period holding over three periods in which transformed interests are repeatedly converted into a position of L interests only, and where such cumulative multi-period interest's return is compared to the multi-period return of the related variable or index.

FIG. 14 performs a test of the system related to cumulative returns and system transformations over multiple periods. In FIG. 14 an initial holding of 10 L interests at inception is rolled over for each of three periods where any S interests delivered by the system in a system transformation are assumed sold at the prevailing system price and the resultant proceeds are reinvested in additional L interests by the holder. The return sequence for the three periods is consistent will all other examples used herein and the returns utilized are +10%, +10%, and −5% for the three periods respectively.

Continuing with FIG. 14 and beginning at the top row, 10 units are assumed purchased for 1.00 each for a invested amount of 10. Row 1 (labeled "after Period 1") displays the period 1 close, post-transformation results relating to the 10 units. As indicated in row 1 under Longs' and Shorts, 10 long units were converted into 11.1111 L (long) units and 1.1111 S (short) units and the closing price for the units is 0.90. Continuing along row 1, the amounts under the column heading "Proceeds" indicates the cash amount resulting from a sale of the 1.1111 shorts at 0.90, and the amount under Longs" indicates the sum of Longs' plus a purchase of 1.1111 additional L units (also at a price of 0.90) through the use of Proceeds. Value indicates the ending value of the position. The results indicated in row 2 (labeled "after Period 2") are calculated similarly to those in row 1; and row 2 begins with 12.2222 (11.1111+1.1111) long interests.

Continuing with FIG. 14 in the final period in row 3 (labeled "after Period 3"), 14.938272 L (long) units from period 2 are transformed into an identical position of 14.938272, L (long) units which carry a system generated closing price at the end of period 3 of 0.7695. The final value for the initial 10 L (long) units rolled over three periods is 11.495, and the value is indicated as the last value under the column heading "Value" at 102 (the product of the system closing price of 0.7695, and the number of L interests 14.938272). In comparison, the pure mathematical return sequence which results from the three periods is indicated at 104, and is the product of the initial investment (10) and the 3 returns:

theoretical value=10×(1+10%)×(1+10%)×(1−5%)=11.495

The theoretical value is indicated at 104 and is exactly equal to the system generated value indicated at 102.

Figure 15:
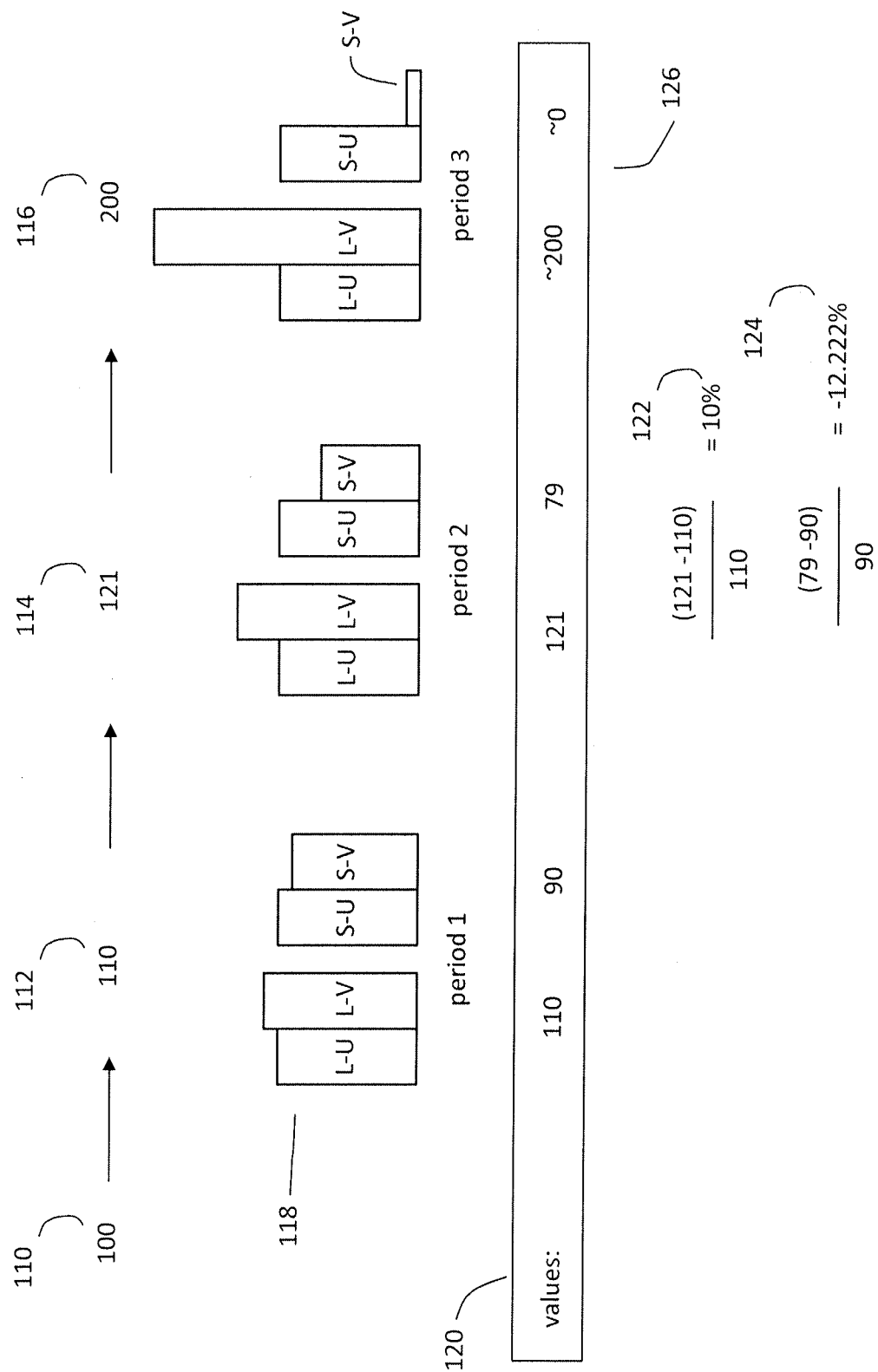
FIG. 15 is a graphic timeline illustration of known methods returns over a three period scenario.

FIG. 15 is a summary illustration of known previously known methods. Rather than the transformation process, real-time monitoring, and active system of transformation of the disclosed embodiment, previously known methods rely on a "see-saw" concept where side-by-side trusts exchange a fixed amount of value back and forth. As the related variable or index trends in one direction or another, the interest with favorable moves attracts all of the value of the side-by-side trusts and the interest with the adverse move is driven to a value of zero. In the figure, the index is assumed to have started at 100 (FIG. 15, 110) and the index is assumed to move over the three periods to 110, 121, and 200 respectively (FIG. 15, at 112, 114, and 116). In the bar figures at 118, L-U and L-V indicate unit counts (U) and values (V) for the L interest for each period, and S-U and S-V indicate unit counts (U) and values (V) for the S interest for each period. The example in the figure assumes no creations or redemptions of interests, and it can be noted that the number of units under previously known methods does not vary.

Continuing with FIG. 15, the values indicated at 120 display the interest values at each period's close. Considering the first period close, the index has moved from 100 to 110 and as a result the values attributable to the L and S interests have moved to 110 and 90 respectively. Such first values are consistent with the disclosed embodiment. The previously known methods and disclosed embodiment diverge for all subsequent periods. Considering the second period move to an index level of 121 from 110 (at 114 and 112), a new investor at the close of period 1 or opening of period 2 would expect a return of up 10% for the L interest and down 10% for the S interest consistent with the simple period return equation at 122. Instead a new investor in the S interest would experience a return of −12.222% as indicated at 124. This result is due to the reliance on the see-saw concepts where the see-saw balance is fixed at inception of the vehicle with a initial index value of 100 (at 110). It can be noted in the previously known methods that, aside from ancillary income and fees, the interests will sum to a fixed value (200 in the example), but the period-to-period returns diverge from what is implied by the interest's prices.

Continuing with FIG. 15 where the index has doubled to 200 at 116, known methods (because they do process transformations) force the L interest value to 200 and S interest value to 0 causing a cliff-effect unwind and the vehicle is forced into a rapid termination. The point of discontinuous unwind upon a doubling of the index is illustrated at 126 where the L interest is approximately 200 and the S interest is approximately 0. Known methods must unwind in a rapid discontinuous manner when the index approaches a doubling. By contrast, the disclosed embodiment, following the processes detailed in FIG. 8, FIG. 9, and the other processes described herein can accommodate a four-fold and higher increase of the index. The disclosed embodiment can consistently perform when the index exceeds 400, while previously known methods must unwind before 200. Applying the system processes, including the algorithms of FIG. 8, to a monotonic increase in the index level of 35% per period for 5 consecutive periods results in an index level of 448.4% of the initial level and results in a per unit interest price greater than 11% of the initial interest price level (i.e. no interest has converged to zero)—where known methods break through zero at only 200.

Figure 16:
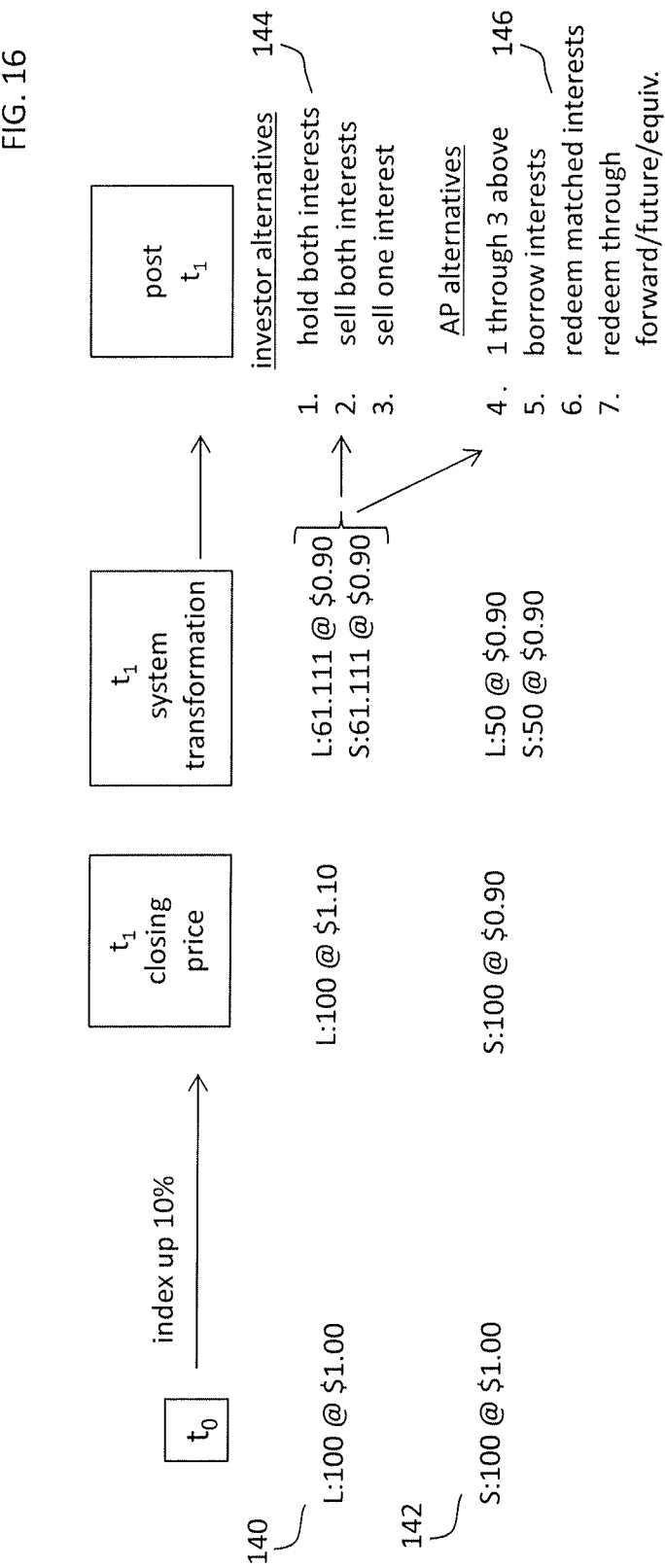
FIG. 16 is a time line diagram which illustrates the system valuation and transformation over a single period scenario where the feasible set of post-transformation transactions is listed.

FIG. 16 is a timeline illustration of the continuing example where the 100 L interests are traced across the row indicated at 140 and the 100 S interests are traced across the row indicated at 142. At rows 140 and 142, time t(1), each interest is valued in accordance with the system equations at 27 and 28. Following each row under the heading "t(1) system transformation", the system transforms each interest in accordance with the system equations at 81 through 85 (employing a full transformation) where (i) 100 L interests are transformed into 61.1111 L and 61.1111 S interests, and (ii) 100 S interests are transformed into 50 L and 50 S interests. Because carry and fees are assumed zero for the illustration, it can be noted that the sum products at t(0) and t(1)-post adjustments are unchanged at 200. The system has caused a transfer of value based on interests transformation of minus 10 to the S (short) interest and plus 10 to the L (long) interest.

Continuing at rows 140 and 142, the time t(1) system transformations will be executed by the system based on system monitored timeframes where a timeframe can be a precise elapsed period of time since the last transformation, an irregular but system determined timetable, or a time based on system monitoring of changes, settings or pricings of the subject variable or index. Examples of system transformations which are triggered by settings or pricings in the subject variable or index are:

1. a traded commodity: the dates and times on which an exchange uses market prices for the settlement of futures or options contracts;
2. a bond or note: the dates and times on which the results of an auction or market poll are released; and
3. a sporting event: the time at which the score of a particular game is made final by recognized officials or a governing body.

The above list is for illustration and not intended to be exhaustive. Other embodiments may use other setting and resetting timings.

FIG. 16 at 144, items 1 through 3, list the alternative actions available to a regular holder of a newly transformed interest. As indicated at 144 item 1, a holder can retain both interests which, post-adjustment and ignoring fees, will reflect a stable value of $110 in the case of the transformed L interest and $90 in the case of transformed S interest. In each case the holders have a balanced pair of S and L interests which will offset relating to adjustments in the related variable or index. As indicated at 144, item 2, a holder can sell both interests to realize the gain or loss associated with the price value immediately preceding the system transformation. As indicated at 144, item 3 a holder can sell one interest to reestablish a potentially variable position with respect to the subject variable or index. Options 1 and 2 are critical and unique to the disclosed embodiment; even in an instance where realizable market prices breakdown, a holder of either interest is assured of realizing the accurate return to the most recent transformation date, and on that date or on some convenient date thereafter, a holder can redeem a fully transformed pair (directly or indirectly with the issuing entity) for a known amount of cash.

FIG. 16 at 146, items 4 through 7, list the alternative actions available to a subset of holders including authorized participants (APs). Authorized participants are generally banks or larger market-makers with the capability to transact in large amounts. As indicated at 146, item 4, APs may execute any of items 1 through 3. As indicated at 146, item 5, APs may enter into a borrow arrangement with the issuing entity to borrow an interest for the purpose of (i) effecting a paired redemption with the issuer, (ii) settling a short position, or (iii) any other purpose customary in the context of an issuer borrow arrangement. A borrow example is illustrated below in FIG. 19.

As indicated at 146 item 6, an AP may present an equivalent quantity of L and S interests to the issuer entity (or agent for the issuer entity) in consideration for par plus-or-minus carry and fees where par equals the average of the L and S price as of the last system transformation ($1.00 in the case of the continuing example). As indicated at 146 item 7, an AP can redeem a single interest (i.e. S or L) through the use of a forward, futures, or equivalent contract. An example is contained in FIG. 20 below.

Figure 17:
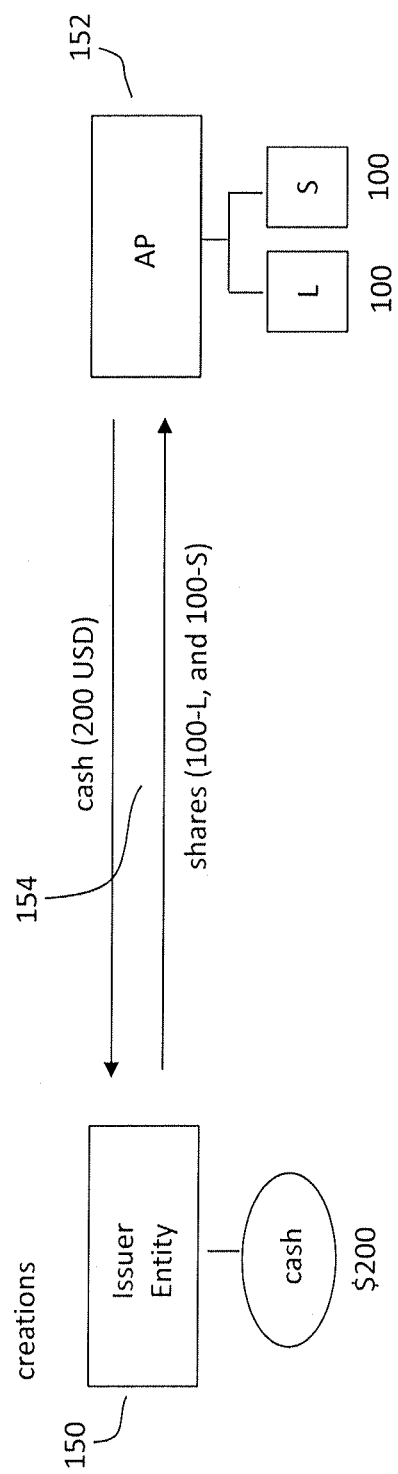
FIG. 17 is a diagram which illustrates standard creation of the interests between an issuer entity and an authorized participant (AP)

FIG. 17 illustrates a system creation/issuance between the issuer entity 150 and an authorized participant (AP) 152. As indicated at 154, an AP may cause an issuance of paired interests in consideration for cash. Consistent with the example which started at FIG. 1, the system creates and delivers 100 L interests (@ $1.00) and 100 S interests (@ $1.00) in consideration for $200 in cash. The balance sheet presentation in FIG. 1 indicates the issuer entity position immediately following this creation.

FIG. 18 illustrates pair redemption between the issuing entity 150 and an AP 152. In an exchange indicated at 156, an AP will deliver L (long) and S (short) interests in equal amount in consideration for an amount of cash which equals the total number of interests times the average system generated price of the interests (in practice, an adjustment is made to the cash amount for fees and carry if any). Continuing with the example, and assuming the AP holds 100 L interests and 100 S interests and assuming their respective price immediately following time t(1) are $1.10 and $0.90 respectively, the AP would deliver 100L interests and 100S interests in consideration for $200 in cash [2×100×0.5×(1.10+0.90)]. This example assumes carry and fees to be zero.

FIG. 19 illustrates a borrow redemption between the issuer entity 150 and an AP 152. At 158, the AP borrows Y units of the L interest and posts cash collateral in an amount equal to or greater than the market value of the L interests borrowed. Continuing with the example, if the AP borrowed 100 L interests at time t(1), the AP posts an amount not less than $110 (100×$1.10). At 160, the closing of the borrowing is illustrated in which the AP 152 returns Y units of L shares (in the example 100 L shares) in exchange for cash collateral posted. As indicated in the footnote to FIG. 19, the cash returned to the AP may be adjusted upwards or downwards for borrowing costs and interest. In an instance where an AP held 100 S interests and desired to execute a pair redemption as depicted in FIG. 18, the AP executes the transaction indicated at 158, followed by the transaction indicated at 156, and then followed by the transaction indicated at 160. The AP may hedge its share borrow obligation (158 to 160) by trading other contracts and instruments with other parties unrelated to the issuer entity.

The borrowing mechanic illustrated in FIG. 19 is of particular use in embodiments where the issuing entity is precluded from engaging in derivative transactions where derivatives include forwards or futures arrangements.

Figure 20:
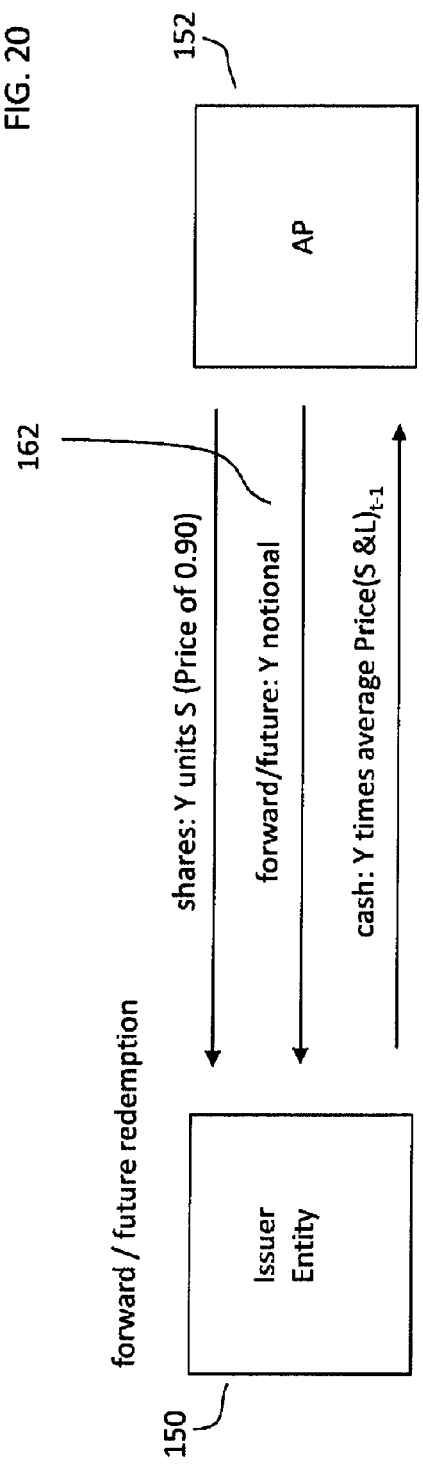
FIG. 20 is a diagram which illustrates the redemption of a single interest with a forward/futures contract.

FIG. 20 illustrates a forward or futures contract redemption between the issuing entity 150 and the AP 152. At 162, an exchange with 3 parts is illustrated. At 162, the AP delivers (i) a number of interest units; as indicated in the example Y units of the S (short) interest, and (ii) a forward or futures contract with a market position opposite to the delivered shares in (i), and a notional amount equivalent to the shares in (i). At 162, the issuing entity 150 delivers cash equal to Y times the average price of S and L interests.

Figure 21:
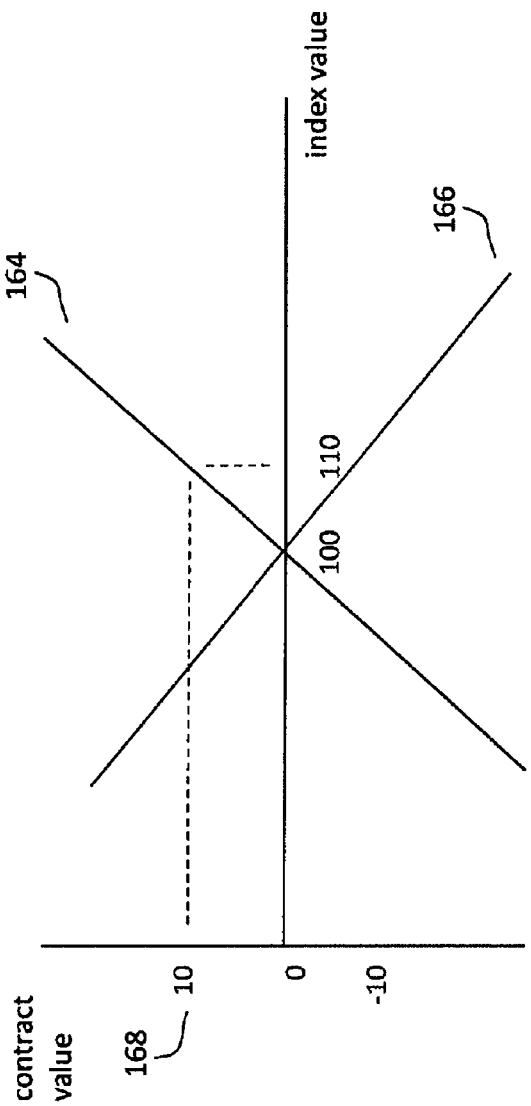
FIG. 21 is a return diagram which illustrates the forward/futures contract applicable for a single interest redemption.

FIG. 21 is a payoff diagram which illustrates the forward/futures contract deliverable by the AP in the context of forward/fixtures redemption (FIG. 20). The contract value from the perspective of the issuing entity is depicted on the y-axis, and the value of the subject variable or index is indicated on the x-axis. The forward contract at 164 is a long contract and will be paired with S (short) interests in redemption. The forward contract at 166 is a short contract and will be paired with L (long) interests in redemption.

Continuing with the example in which the subject variable has increased 10% and the price levels of the long and short interests are $1.10 and $0.90 respectively, the forward contract deliverable by the AP indicated at point 168 is consistent with the forward contract at 164, and as indicated, the contract has a positive value of +10 at 168 when the applied notional amount is 100.

Preferred embodiments will vary with respect to the presence of a forward/future redemption process. The variation of embodiments include: (i) embodiments in which no forward/future redemption is provided, (iii) embodiments in which the forward/future redemption process can be effected by a holder redeeming units through the delivery of an over-the-counter (OTC) bilateral forward contract over the linked index or variable with a notional amount determined by the system and with a setting or strike equivalent over such index or variable equal to that utilized by the system for the immediately preceding transformation date, and (iii) embodiments which require the forward contract specified in (ii) above to be delivered in the form of an exchange traded futures contract or to be delivered in an equivalent claim over a centralized exchange or clearing counterparty.

Not all embodiments have a forward/futures redemption feature.

Figure 22A:
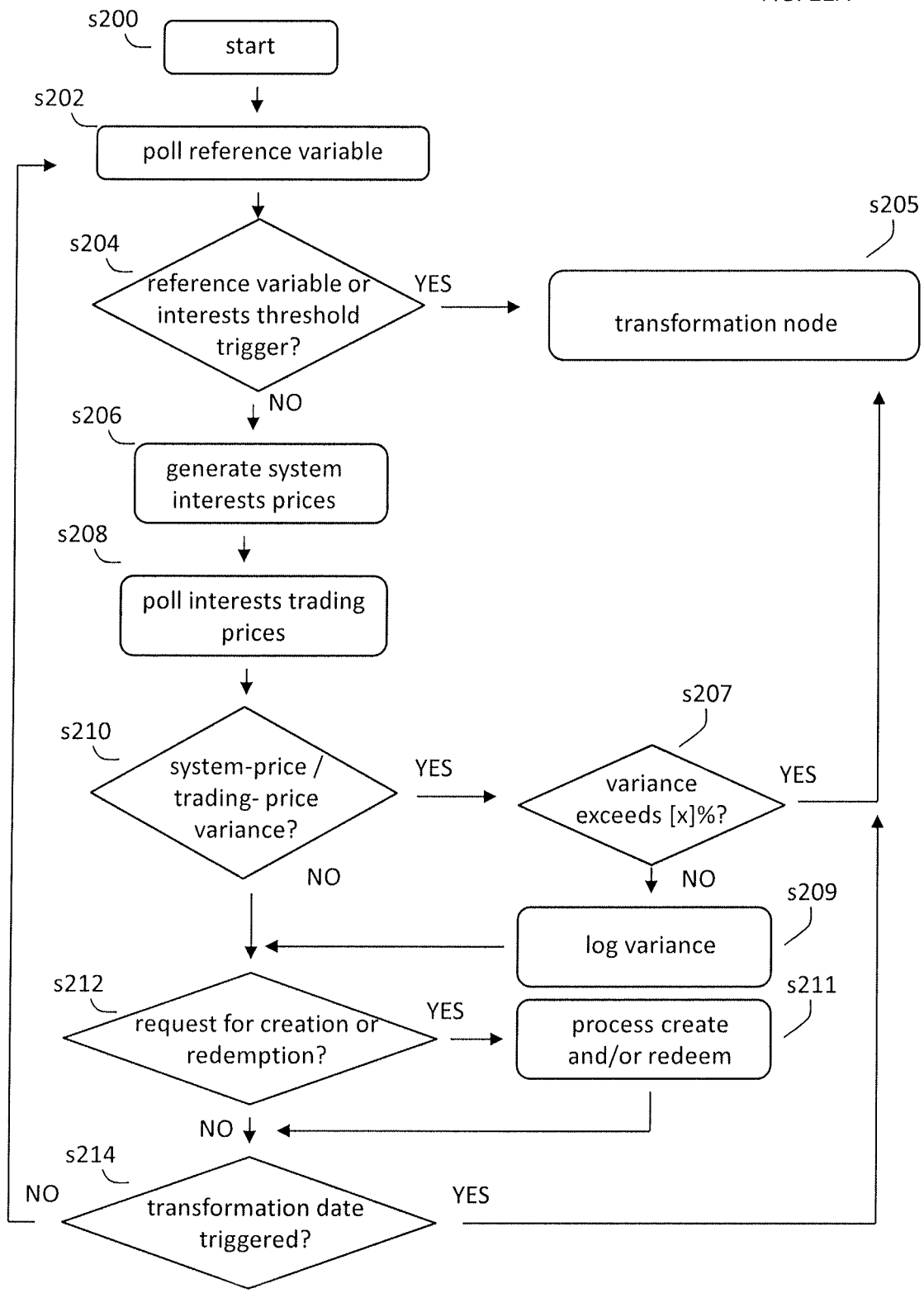
FIG. 22A is a flow diagram summarizing procedural steps of the system with respect to interests monitoring and transformation.

FIG. 22A is a flow diagram of an exemplary embodiment. The flow diagram is a summary example of the system monitoring and system transformation processes.

In FIG. 22A, beginning at s200 ("start"), it is assumed that the system has already created and issued at least one offsetting grouping of interests. For example 100 S interests and 100L interests as depicted in FIG. 1. The process loop which runs from s202 to s214 in FIG. 22A is expected to be run continuously and repeated many times during a one-minute timeframe.

Moving to s202, the system polls the reference variable or index for the purpose of creating system generated prices. The polled value acquired at s202 is utilized by the system in algorithms 27, 28. The reference variable is acquired from financial data service providers, government agencies, financial exchanges, news wire services or similar entities. The value or values obtained at s202 are stored by the system on RAM or disc storage for system access in remaining processes.

Moving to s204, the system tests the polled value from s202 to ensure that it does not cause the interests to breach any boundaries. Examples of such a breach are: (i) the reference variable is no longer obtainable, (ii) the reference variable has reached or exceeded an unexpectedly high level in relationship to a preceding observation (e.g. a 100% increase since the immediately preceding transformation date or a 500% or greater increase from inception), (iii) the polled reference variable causes the resultant system generated price for one or more interests to be too low, and (iv) the reference variable has reached an unexpectedly low level and is indistinguishable from zero. In the unlikely event that a reference variable or interests threshold trigger is breached the system process will proceed to the transformation node at s205. The transformation node at s205 is detailed in FIG. 22B.

Moving to s206, the system generates prices for the interests consistent with the algorithms at 27, 28.

Moving to s208, the system polls the trading prices for interests. Trading prices are acquired from financial exchanges, Bloomberg, or financial data service providers. Trading prices are stored in RAM or disc storage for system access in the price variance monitoring process.

Moving to s210, the system measures the difference, if any, between the system generated prices at s206 and the market trading prices at s208. If a measured variance is not fleeting or does no otherwise dissipate over a normal sequence of trades, the system process proceeds to s207.

Moving to s207 (and presuming that a measured variance existed at s210), the system measures the degree of the variance and its persistence over sequential market trades. At s207, if the variance exceeds an acceptable temporary tolerance (e.g. 2% or an absolute value such as $0.15), the system proceeds to the transformation node at s205. In a preferred embodiment, arriving at the transformation node through step s207 represents an automatic acceleration of the transformation date by the system. If the measured variance is below the threshold relating to s207, the system logs the variance occurrence at s209 and the system stores the variance occurrence and the magnitude of the variance in an internally stored database for the purpose of the transformation determination process at step s222 below.

Moving to s212, the system monitors for any requests for the creation or redemption of interests. The requests are made electronically by certain types of market participants and the requests are made over an electronic system which may be connected through an internet linkage or through a customized network or messaging system. If requests to create or redeem are received, they are processed by the system at s211, and the values acquired at the immediately preceding steps (s202, s206, and s208) are utilized for the related creation or redemption.

Moving to s214, the system monitors whether or not a transformation date is due. Examples of transformation date indications are: (i) a specific amount of time or number of days has elapsed since the immediately preceding transformation date, (ii) where applicable, a related futures event has settled on a financial exchange, (iii) where applicable, a government statistic has been released, and (iv) where applicable, an uncertain event has resolved such as an election or sporting contest. In the event that the system affirmatively determines that a transformation date is due, the process moves to the transformation node at step s205. In the event that the system determines that a transformation date is not due, the system returns to step s202 in FIG. 22A.

Figure 22B:
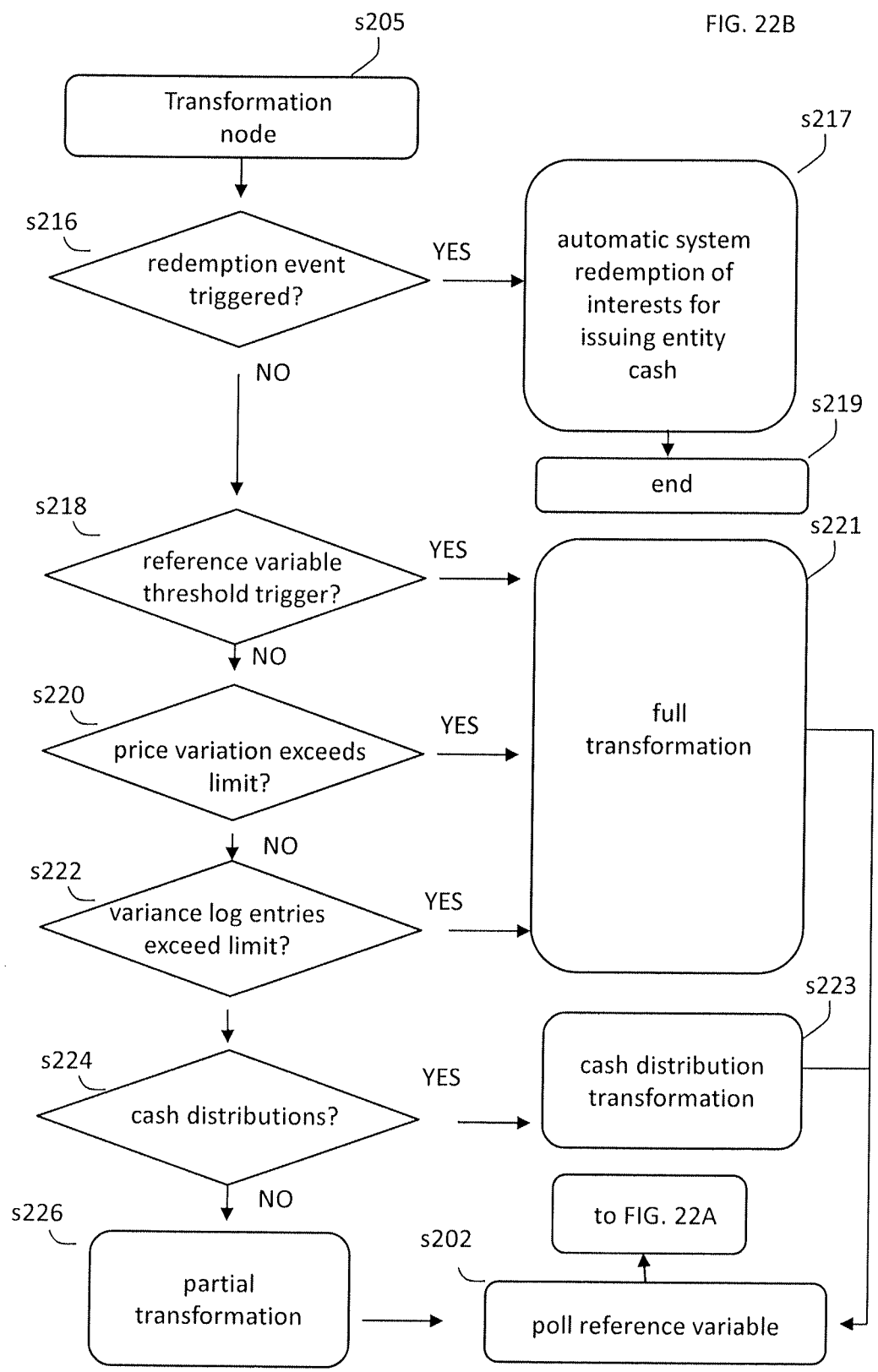
FIG. 22B is a flow diagram and a continuation of FIG. 22A.

FIG. 22B begins with the transformation node at step s205. Through the steps that follow, the system automatically determines if the interests are due for redemption, full transformation, partial transformation, or transformation with cash distributions. Following such determination, and following the execution of the transformation, the system moves to step s202 indicated at the bottom of FIG. 22B, and the process reverts to the top of FIG. 22A at step s202.

Moving to s216, the system determines if an interest redemption event is triggered. A redemption event is consistent with a reference variable and interests threshold trigger determined at s204. Upon the determination of a redemption event trigger, the system automatically implements redemption of the interests for cash at s217. Following s217 and cash redemption of interests, the process ends at step s219.

Moving to s218, the system determines if a reference variable trigger has been breached. A reference variable trigger is determined to have occurred if the reference index or variable has experienced a large absolute or percentage move since the last transformation date, where such reference variable or index was acquired by the system at s202. Upon a system determined reference variable threshold trigger, the system automatically processes a full transformation of the interests consistent with FIG. 11 as indicated at s221. After s221, the system begins the process at the top reverting to s202 FIG. 22A.

Moving to s220, the system determines if a price variation limit has been exceeded and such determination will be determined by reference to the values acquired at s206 and s208. If the system determines that the variation between system generated prices and market trading prices for one or more interests of a grouping exceeds a pre-determined threshold (e.g. 2% or $0.15), the system automatically processes a full transformation of the interests consistent with FIG. 11 as indicated at s221. After s221, the system will begin the process at the top reverting to s202 FIG. 22A.

Moving to s222, the system accesses its internally stored data files to examine the number of price variances which have been recorded. Price variances at s222 are distinguished from price variances at s220 in that at s222, the system looks for an excessive number of price discrepancies which fell below the threshold applicable to s220 (i.e. the system finds too many material price discrepancies, each of which is below 2% and $0.15). Upon a positive determination at s222, the system processes a full transformation of the interests consistent with FIG. 11 as indicated at s221. After s221, the system begins the process at the top reverting to s202 FIG. 22A.

Moving to s224, the system determines if cash distributions are specified. In a preferred embodiment, a positive determination causes the system to process a full transformation of the interests consistent with FIG. 12 as indicated at s223. In an alternate preferred embodiment, a positive determination causes the system to created interest pairs subject to cash redemption. After s223, the system begins the process at the top reverting to s202 FIG. 22A.

Moving to s226, the system automatically processes a partial transformation of the interests consistent with FIG. 11. Following the transformation the process reverts to step s202.

It is to be understood that the above disclosed electronically processed, managed and traded, and transforming issuing entities include an entity management and transformation computer node 250 FIG. 23. The node is electronically connected to an issuing entity management and transformation electronically connected network 252, which further includes a plurality of computer nodes 254 through 258 that receive creation and redemption orders for transacting issuing entity interests, and which further includes a plurality of computer nodes 260 through 262, which receive live data streaming on both the linked variable or index and on the market trading prices of the interests. That is, the interests are created, transformed and redeemed, and transformation processes are automatically selected based on orders and data streaming received at various computer nodes on a network 252 where such network is an internet network, cellular network, LAN, WAN, a combination thereof, or a similar configuration.

On the issuing entity processing node at 250, system creation, redemption and transformation software 266 is stored on RAM 268. The issuing entity management and transformation software at 266 instructs the issuing entity management and transformation computer node 250 to substantially continuously electronically communicate with the networked computer nodes for tracking the creation and redemption of interests (254 through 258) and for monitoring the data streaming relating to transformation processes (260 through 262).

It is noted that system real time monitoring processes are performed continuously during a market period and transformation processes are performed concurrent with a transformation date. In order to comply with the regulation of exchanges (e.g. NASDAQ, NYSE-Arca), government agencies (e.g. U.S. Securities and Exchange Commission), and self-regulatory-organizations (e.g. FINRA) rulemaking, the processes occurring intra-period (between transformation dates) will be performed either instantaneously or at a minimum within fractions of a minute. Similarly, the processes run on a transformation date will be subject to completion and auditing within 60 minutes or less of the immediately preceding market close.

The above disclosed embodiments are not intended to limit the scope of the invention but are examples thereof. Other alternative embodiments or implementations according to the various teachings of the present invention will be understood by those skilled in the art and are achieved without departing from the spirit and scope of the invention. It is therefore intended that the present invention is not limited to the disclosed embodiments described herein but should be defined in accordance with the claims that follow.

What is claimed:

1. A method of creating, monitoring, and transforming multiple interests of a fund for producing return outcomes based on an exogenous variable, comprising the steps of:

creating and transforming on a financial computer system a plurality of interests on a periodic basis from a plurality of issuing entities that are joined to both a single central holding entity and at least one interest grouping; said single central holding entity and said at least one interest grouping containing said plurality of interests;

aggregating cash received in a limiting manner from an interest holder to a common single asset account and at said single central holding entity;

increasing by the financial computer system a relative entitlement of at least one of said plurality of interests over said common single asset account in response to increases in an exogenous index and decreases in said exogenous index;

wherein, said increasing of said relative entitlement is performed by the financial computer system through either a full transformation or a partial transformation of said plurality of interests for a single transformation, the financial computer system will perform only one of either said full transformation or said partial transformation;

said full transformation performed by the financial computer system is a transformation of an entire pre-transformation value of said plurality of interests; and said partial transformation performed by the financial computer system is said transformation of only a portion of said pre-transformation value of said plurality of interests wherein said transformation of said plurality of interests represent tangible property of said interest holder such that said plurality of interests can be sold, pledged or otherwise transacted with precise determined parameters;

and processing said full transformation or said partial transformation by the financial computer system through creating and delivering of an additional number of said plurality of interests; said additional number are in a form of at least two types-wherein a first type is a proportion of said relative entitlement over said common single asset account that increases in response to an increase in said exogenous index, and wherein a second type is another portion of said relative entitlement over said common single asset account that increases in response to a decrease in said exogenous index; and determining a total unit count of said plurality of interests created by the financial computer system in said single transformation; said total unit count of said plurality of interests is based on:

$TU(S)_t = TV(S)_t / \min(\text{Price}(S)_t, \text{Price}(L)_t)$, wherein

TU(S)$_t$ is said total unit count of an interest "S" of said plurality of interests created by the financial computer system in said single transformation;

TV(S)$_t$ is a system generated transformation value of an interest "S" representing said portion of said pre-transformation value of said plurality of interests; TV(S)$_t$ is equal to a non-negative value difference between said pre-transformation value, and said another pre-transformation value within said interest grouping that has said lowest system generated pre-transformation value;

Price (S)$_t$, Price (L)$_t$ is a vector of system prices of said plurality of interests;

and min is a minimum value of variable functions Price (S)$_t$, Price (L)$_t$ automatically selecting by the financial computer system for correction of market anomalies or material pricing anomalies a form of denomination of transformation that is selected from at least one of: matched and offsetting combination of said at least two types, matched and offsetting combination of said at least two types which are automatically identified and determined for redemption by the financial computer system for a cash value, and matched and offsetting combination of said at least two types and an amount of cash or cash equivalents; and wherein said common single asset account contains only cash or other cash equivalents.

2. The method of claim 1, wherein the transforming of said plurality of interests, either partially or fully, further includes:
generating said system value of said transformed plurality of interests that is equal to a previous system generated value immediately preceding said transformation and adjusting said system value for any cash distributions performed in connection with said transformed plurality of interests.

3. The method of claim 1, further including:
continuously monitoring, on the financial computer system, market trading prices of said plurality of interests reported on one or more public securities exchanges;
comparing said market trading prices with said system values; and
automatically fully transforming all said plurality of interests that indicate a deviation between said market trading prices and said system values that exceeds a pre-determined threshold amount for a pre-determined period of time.

4. The method of claim 1, wherein said processing said full transformation or said partial transformation further includes:
applying to, at least one of said plurality of interests subject to said full transformation or partial transformation are identified by the financial computer system by a positive difference between said system value concurrent with said full or partial transformation and a previous system value as of an immediately preceding said full or partial transformation.

5. The method of claim 1, wherein said processing said full transformation or partial transformation further includes:
delivering by the computer financial system a combination of said plurality of interests, where said combination results from said full transformation or said partial transformation, wherein said full transformation or partial transformation is neutral and offsetting with respect to the exogenous index, and wherein said plurality of interests created by the financial computer system are at least one of: immobilized interests in book entry form wherein book entries are stored on RAM, disc, or non-transitory media and accessible through internet or other network, physically certificated interests, immobilized interests over which tangible property claims are evidenced through electronic records stored on RAM, disc, or non-transitory media, and interests that are immediately redeemed for a cash amount equivalent to the financial computer system generated value.

6. The method of claim 5, further including,
automatically processing by the financial computer system calculations relating to said full transformation or said partial transformation based on a threshold level relative to an absolute gain set by an administrator, and
distributing cash from said common single asset account in lieu of creating and distributing said plurality of interests wherein a system generated transformation value is below said threshold level, and wherein a post-transformation system price is unaffected by an absence of said creating and delivering of an additional number of said plurality of interests.

7. A system for initiating a real-time specialized financial computer comprising:
a memory device; and
a processor disposed in communication with the memory device, the processor configured to:
create and transform on a financial computer system a plurality of interests on a periodic basis from a plurality of issuing entities that are joined to both a single central holding entity and at least one interest grouping; said single central holding entity and said at least one interest grouping containing said plurality of interests;
aggregate cash received in a limiting manner from an interest holder to a common single asset account and at said single central holding entity;
increase by the financial computer system a relative entitlement of at least one of said plurality of interests over said common single asset account in response to increases in an exogenous index and decreases in said exogenous index;
wherein, said increase of said relative entitlement is performed by the financial computer system through either a full transformation or a partial transformation of said plurality of interests for a single transformation, the financial computer system will perform only one of either said full transformation or said partial transformation;
said full transformation performed by the financial computer system is a transformation of an entire pre-transformation value of said plurality of interests;
and said partial transformation performed by the financial computer system is said transformation of only a portion of said pre-transformation value of said plurality of interests wherein said transformation of said plurality of interests represent tangible property of said interest holder such that said plurality of interests can be sold, pledged or otherwise transacted with precise determined parameters;
and
process said full transformation or said partial transformation by the financial computer system through creating and delivering of an additional number of said plurality of interests; said additional number are in a form of at least two types-wherein a first type is a proportion of said relative entitlement over said common single asset account that increases in response to an increase in said exogenous index, and wherein a second type is another portion of said relative entitlement over said common single asset account that increases in response to a decrease in said exogenous index; and determine a total unit count of said plurality of interests created by the financial computer system in said single transformation; said total unit count of said plurality of interests is based on:

$TU(S)_t = TV(S)_t/\min(\text{Price }(S)_t, \text{Price }(L)_t)$, wherein $TU(S)_t$ is said total unit count of an interest "S" of said plurality of interests created by the financial computer system in said single transformation;

$TV(S)_t$ is a system generated transformation value of an interest "S" representing said portion of said pre-transformation value of said plurality of interests; $TV(S)_t$ a is equal to a non-negative value difference between said pre-transformation value, and said another pre-transformation value within said interest grouping that has said lowest system generated pre-transformation value;

Price $(S)_t$, Price $(L)_t$ is a vector of system prices of said plurality of interests;

and min is a minimum value of variable functions Price $(S)_t$, Price $(L)_t$ automatically select by the financial computer system for correction of market anomalies or material pricing anomalies a form of denomination of transformation that is selected from at least one of: matched and offsetting combination of said at least two types, matched and offsetting combination of said at least two types which are automatically identified and determined for redemption by the financial computer system for a cash value, and matched and offsetting combination of said at least two types and an amount of cash or cash equivalents; and wherein said common single asset account contains only cash or other cash equivalents.

8. A non-transitory computer readable medium comprising:

instruction code for creating and transforming on a financial computer system a plurality of interests on a periodic basis from a plurality of issuing entities that are joined to both a single central holding entity and at least one interest grouping; said single central holding entity and said at least one interest grouping containing said plurality of interests;

instruction code for aggregating cash received in a limiting manner from an interest holder to a common single asset account and at said single central holding entity;

instruction code for increasing by the financial computer system a relative entitlement of at least one of said plurality of interests over said common single asset account in response to increases in an exogenous index and decreases in said exogenous index;

wherein, said increasing of said relative entitlement is performed by the financial computer system through either a full transformation or a partial transformation of said plurality of interests for a single transformation, the financial computer system will perform only one of either said full transformation or said partial transformation;

said full transformation performed by the financial computer system is a transformation of an entire pre-transformation value of said plurality of interests;

and said partial transformation performed by the financial computer system is said transformation of only a portion of said pre-transformation value of said plurality of interests wherein said transformation of said plurality of interests represent tangible property of said interest holder such that said plurality of interests can be sold, pledged or otherwise transacted with precise determined parameters;

and instruction code for processing said full transformation or said partial transformation by the financial computer system through creating and delivering of an additional number of said plurality of interests; said additional number are in a form of at least two types-wherein a first type is a proportion of said relative entitlement over said common single asset account that increases in response to an increase in said exogenous index, and wherein a second type is another portion of said relative entitlement over said common single asset account that increases in response to a decrease in said exogenous index; and instruction code for determining a total unit count of said plurality of interests created by the financial computer system in said single transformation; said total unit count of said plurality of interests is based on:

$TU(S)_t = TV(S)_t/\min(\text{Price }(S)_t, \text{Price }(L)_t)$, wherein $TU(S)_t$ is said total unit count of an interest "S" of said plurality of interests created by the financial computer system in said single transformation;

$TV(S)_t$ is a system generated transformation value of an interest "S" representing said portion of said pre-transformation value of said plurality of interests; $TV(S)_t$ is equal to a non-negative value difference between said pre-transformation value, and said another pre-transformation value within said interest grouping that has said lowest system generated pre-transformation value;

Price $(S)_t$, Price $(L)_t$ is a vector of system prices of said plurality of interests;

and min is a minimum value of variable functions Price $(S)_t$, Price $(L)_t$ instruction code for automatically selecting by the financial computer system for correction of market anomalies or material pricing anomalies a form of denomination of transformation that is selected from at least one of: matched and offsetting combination of said at least two types, matched and offsetting combination of said at least two types which are automatically identified and determined for redemption by the financial computer system for a cash value, and matched and offsetting combination of said at least two types and an amount of cash or cash equivalents; and wherein said common single asset account contains only cash or other cash equivalents.

* * * * *